United States Patent
Guner et al.

(10) Patent No.: US 10,663,619 B2
(45) Date of Patent: May 26, 2020

(54) APPARATUS AND METHODS TO VISUALIZE FORMATION RELATED FEATURES

(71) Applicant: Halliburton Energy Services, Inc., Houston, TX (US)

(72) Inventors: Baris Guner, Kingwood, TX (US); Burkay Donderici, Houston, TX (US); Hsu-Hsiang Wu, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 628 days.

(21) Appl. No.: 14/764,521

(22) PCT Filed: Feb. 5, 2013

(86) PCT No.: PCT/US2013/024764
§ 371 (c)(1),
(2) Date: Jul. 29, 2015

(87) PCT Pub. No.: WO2014/123509
PCT Pub. Date: Aug. 14, 2014

(65) Prior Publication Data
US 2016/0003973 A1    Jan. 7, 2016

(51) Int. Cl.
*G01V 3/38* (2006.01)
*G01V 99/00* (2009.01)

(52) U.S. Cl.
CPC ............... *G01V 99/00* (2013.01); *G01V 3/38* (2013.01); *G01V 99/005* (2013.01); *G01V 2210/74* (2013.01)

(58) Field of Classification Search
CPC ...... G01V 3/38; G01V 99/00; G01V 2210/74; G01V 99/005
See application file for complete search history.

(56) References Cited

U.S. PATENT DOCUMENTS

| | | |
|---|---|---|
| 7,308,139 B2 | 12/2007 | Wentland et al. |
| 7,340,347 B2 | 3/2008 | Shray et al. |
| 7,366,616 B2 | 4/2008 | Bennett et al. |
| 7,630,872 B2 | 12/2009 | Xia et al. |
| 2004/0204859 A1 | 10/2004 | Knobloch |

(Continued)

FOREIGN PATENT DOCUMENTS

| | | |
|---|---|---|
| GB | 2400468 A | 10/2004 |
| GB | 2434289 A | 7/2007 |

(Continued)

OTHER PUBLICATIONS

"International Application Serial No. PCT/US2013/024764, International Search Report dated Dec. 20, 2013", 10 pgs.

(Continued)

*Primary Examiner* — Mischita L Henson
(74) *Attorney, Agent, or Firm* — Gilliam IP PLLC

(57) ABSTRACT

Apparatus and methods to visualize formation properties and distances associated with formations can be implemented in a variety of applications. In various embodiments, one or more visualization schemes and systems arranged to implement such schemes can use a combination of visual structures to provide information about measured formations. Additional apparatus, systems, and methods are disclosed.

41 Claims, 13 Drawing Sheets

(56) References Cited

U.S. PATENT DOCUMENTS

| | | |
|---|---|---|
| 2005/0171698 A1 | 8/2005 | Sung et al. |
| 2006/0074561 A1 | 4/2006 | Xia et al. |
| 2007/0168133 A1 | 7/2007 | Bennett et al. |
| 2007/0213935 A1 | 9/2007 | Fagnou et al. |
| 2007/0274154 A1 | 11/2007 | Simon et al. |
| 2009/0198447 A1 | 8/2009 | Legendre et al. |
| 2010/0122847 A1 | 5/2010 | Xia et al. |
| 2010/0312477 A1* | 12/2010 | Sanstrom ............... G01V 11/00 702/6 |
| 2011/0175899 A1* | 7/2011 | Bittar ..................... E21B 47/00 345/419 |
| 2011/0218775 A1 | 9/2011 | Czernuszenko et al. |
| 2011/0283217 A1 | 11/2011 | Nielsen et al. |

FOREIGN PATENT DOCUMENTS

| | | |
|---|---|---|
| WO | 2009131584 A1 | 10/2009 |
| WO | WO-2010017300 A1 | 2/2010 |
| WO | WO-2014123509 A1 | 8/2014 |

OTHER PUBLICATIONS

"International Application Serial No. PCT/US2013/024764, Invitation to Pay Additional Fees and Partial Search Report dated Oct. 8, 2013", 7 pgs.

"International Application Serial No. PCT/US2013/024764, Written Opinion dated Dec. 20, 2013", 18 pgs.

"Canadian Application Serial No. 2,896,139, Office Action dated Jun. 23, 2016", 4 pgs.

"Mexican Application Serial No. MX/a/2015/007877, Second Office Action dated Sep. 11, 2017".

"Australian Application Serial No. 2013377973, First Statement of Proposed Amendments filed Sep. 29, 2016 in response to Examination Report dated Mar. 18, 2016", 17 pgs.

"Chinese Application Serial No. 2013800646722, Office Action dated Sep. 5, 2016", (w/ English Translation), 27 pgs.

"Chinese Search Report", Chinese Application Serial No. 2013800646722; dated Nov. 27, 2017, 4 pgs.

"Australian Application Serial No. 2013377973, First Examiner Report dated Mar. 18, 2016", 3 pgs.

"European Application Serial No. 13874510.4, Office Action dated May 31, 2016", 2 pgs.

"European Application Serial No. 13874510.4, Office Action dated Jun. 23, 2015", 2 pgs.

"European Application Serial No. 13874510.4, Response filed Nov. 2, 2015 to Office Action dated Jun. 23, 2015", 13 pgs.

"Canadian Application Serial No. 2,896,139, Second Office Action dated May 18, 2017.", 3 pages.

"Chinese Application Serial No. 2013800646722, Second Office Action dated Jun. 1, 2017.", 18 pages (including English summary).

"European Application Serial No. 13874510.4, Extended European Search Report dated Sep. 30, 2016", 13 pgs.

"Mexican Patent Application No. MX/a/2015/007877; Office Action dated Jan. 24, 2017.", 8 pages (including English summary).

"RockWorks 14", Rockworks: XP55303277, Mar. 31, 2008, 47 ; 168 ; 225-239.

"Russian Application Serial No. 2015124692, Office Action dated Nov. 28, 2016.", 6 pages.

Gao, "Volume texture extraction for 3D seismic visualization and interpretation", Geophysics, Society of Exploration Geophysicists, US, vol. 68, No. 4, XP002457444, Jul. 1, 2003, 1294-1302.

Rugis, "Visualizing 3D Geophysical Data Scientific Data Visualization", XP55303105, Oct. 31, 2011.

"International Application Serial No. PCT/U32013/024764, International Preliminary Report on Patentability dated Aug. 20, 2015", 20 pgs.

Omeragic, D., et al., "Deep Directional Electromagnetic Measurements for Optimal Well Placement", *SPE 97045-MS, SPE Annual Technical Conference and Exhibition*, Oct. 9-12, Dallas, Texas, (2005), 1-12.

ID Application Serial No. P-00201503802; ID Substantive Examination Report; dated Mar. 1, 2018, 4 Pages.

Canadian Application Serial No. 2,896,139, Third Examiner's Letter, Apr. 13, 2018, 3 Pages.

"Australian Application Serial No. 2016234992; First Examination Report dated Sep. 22, 2017.", 5 pages.

AU Second Exam Report, Application No. 2016234992; dated Jan. 15, 2018, 4 pages.

GCC First Examination Report Application Serial No. GC 2014-26370, dated Dec. 6, 2017, 5 pages.

CN Application Serial No. 2013800646722, Notice of Grant, dated Jan. 23, 2019, 5 pages.

IN Application Serial No. 4511/DELNP/2015, Examination Report, dated Aug. 1, 2018, 8 pages.

GCC Application Serial No. 2014/36053; Examination Report; dated Dec 20, 2018, 4 pages.

European Application Serial No. 13874510.4; Communication Pursuant To Article 94(3); Feb. 14, 2019, 9 pages.

Canadian Application Serial No. 2,896,139; Examination Report; dated Mar. 27, 2019, 4 pages.

EP Application Serial No. 13874510.4, Comm. Pursuant to Article 94(3), dated Nov. 22, 2019, 21 pages.

\* cited by examiner

APPARATUS AND METHODS TO VISUALIZE FORMATION RELATED FEATURES

PRIORITY APPLICATIONS

This application is a U.S. National Stage Filing under 35 U.S.C. 371 from International Application No. PCT/US2013/024764, filed on 5 Feb. 2013, which application is incorporated herein by reference in its entirety.

TECHNICAL FIELD

The present invention relates generally to apparatus and methods relative to measurements related to oil and gas exploration.

BACKGROUND

In drilling wells for oil and gas exploration, understanding the structure and properties of the associated geological formation provides information to aid such exploration. Measurements in a borehole are typically performed to attain this understanding. Formation properties from data from measurement tools can be indicated by mapping the data to a corresponding color map. For example, resistivity was mapped to color in Operatic, et al., "Deep Directional Electromagnetic Measurements for Optimal Well Placement", SPA 97045, 2005, pp. 1-12, Society of Petrol. Engrs., USA. A straightforward mapping between a pattern and a resistivity value was discussed in U.S. Patent Publication 2006/0074561 A1. The usefulness of such measurements may be related to the precision or quality of the information and the presentation of the information derived from such measurements.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
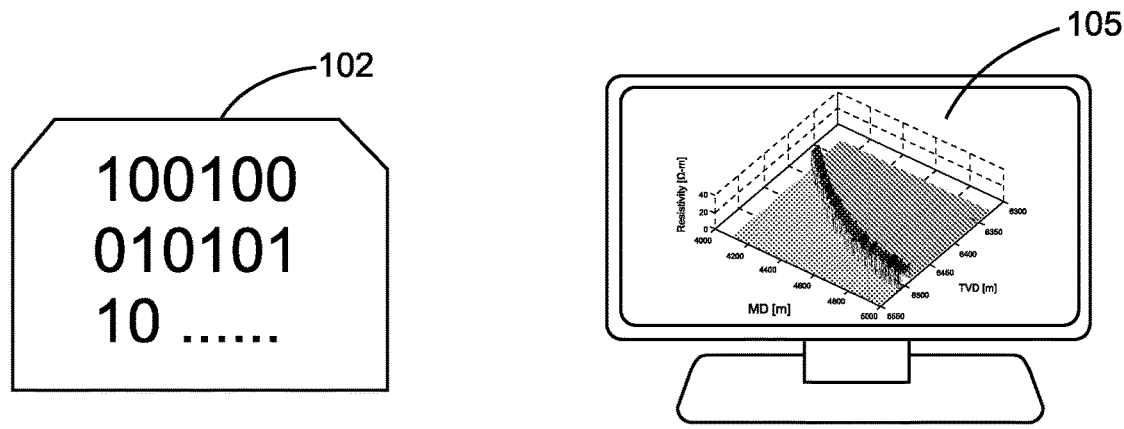
FIG. 1 illustrates visualization of data on a user interface, in accordance with various embodiments.

FIG. 1 illustrates visualization of data 102 on a user interface 105, which can provide some user interaction. In various embodiments, apparatus and methods provide a mechanism to visualize logging data, which may be beneficial to users of the logging data. Such methods can be implemented with user interfaces, which can provide a device that allows user interaction. A user interface can include a display unit and underlining electronics that allow input and output of signals associated with managing and providing data to the display unit. A user interface can be interactive providing a mechanism for input from a user, which may be in response to information displayed to the user by the user interface. A user interface may include hardware and logical components. In such embodiments, a visualization of the data may affect the way the data is interpreted by a petrophysicist. In addition, providing logging data in different visualizations can help a user identify and respond to any problems that may be encountered in a drilling operation in a quick and effective manner.

Visualization schemes can be implemented with logging while drilling (LWD) tools, since such tools may require real time decisions by a field engineer based on the results displayed on a visualizing unit. As an example, an engineer may steer the tool along an optimal well path by looking at the visualized results to maximize oil production. For the accuracy of such a decision, different formation layers and the corresponding formation properties should be presented to the user. These formation layers may include the bed in which the tool is located, as well as an approaching bed, or may include any number of additional beds. Similarly, formation properties may include resistivity, water saturation, sand/shale content, prediction of whether a layer is a hydrocarbon reservoir or not, or any other parameter that may be of use to the engineer. However, visualization schemes can be also implemented with wireline tools.

In various embodiments, visualization schemes can be implemented to visualize inversion data. Inversion is a process of searching for a match between simulated data and measurements. Inversion operations can include a comparison of measurements to predictions of a forward model such that a value or spatial variation of a physical property can be determined. A forward model deals with calculating expected observed values with respect to an assumed model of formation with associated formation properties.

Methods to visualize resistivity and distance inversion results can be implemented to improve geosteering decisions. A number of different visualization methods or combinations of methods can be used. In a visualization method, formation properties can be indicated by mapping the inversion data to a corresponding color map. Since inverted formation properties in a formation layer may be the same or very close, sharp changes in color can indicate to the user the boundary of the layers. In a visualization method, formation properties can be mapped to one or more of pattern type, density, or size, for example. For example, lines or dots may be used to illustrate reservoir and non-reservoir layers and the density of these shapes may indicate the value of the formation property. In a visualization method, depth of investigation or depth of detection can be mapped to image transparency, pattern density, or pattern size. In the regions of space where the data is known to be more accurate, image of data may be made more solid; and patterns and colors of the image may fade out as the depth of investigation is reached. In other implementations, pattern density or pattern size may be modified to convey the depth of investigation information. In a visualization method, height can be used in a three-dimensional (3D) plot to indicate the value of a formation property. Relative variation in the parameter of interest may be easily discernible using this method. Contour lines may also be used for visualizing the relative variation. In a visualization method, the value of a parameter of interest can be printed on the image as a function of position. An operator may easily read the parameter's value at a point of interest from such an image. In a visualization method, the formation properties can be mapped to the size or length of a pattern, or the plotted distance to a boundary. These methods are useful in cases where the contrast between different bed layers needs to be emphasized. In addition, combinations and variations of these methods can provide enhanced insight to formation properties and formation regions of interest.

Color, pattern type, pattern density, pattern size, transparency, and other presentation formats provide a manner or way of assigning or correlating values associated with measured data to a visual representation. Other techniques can also be used to assign or correlate values associated with measured data to a visual representation.

Figure 2:
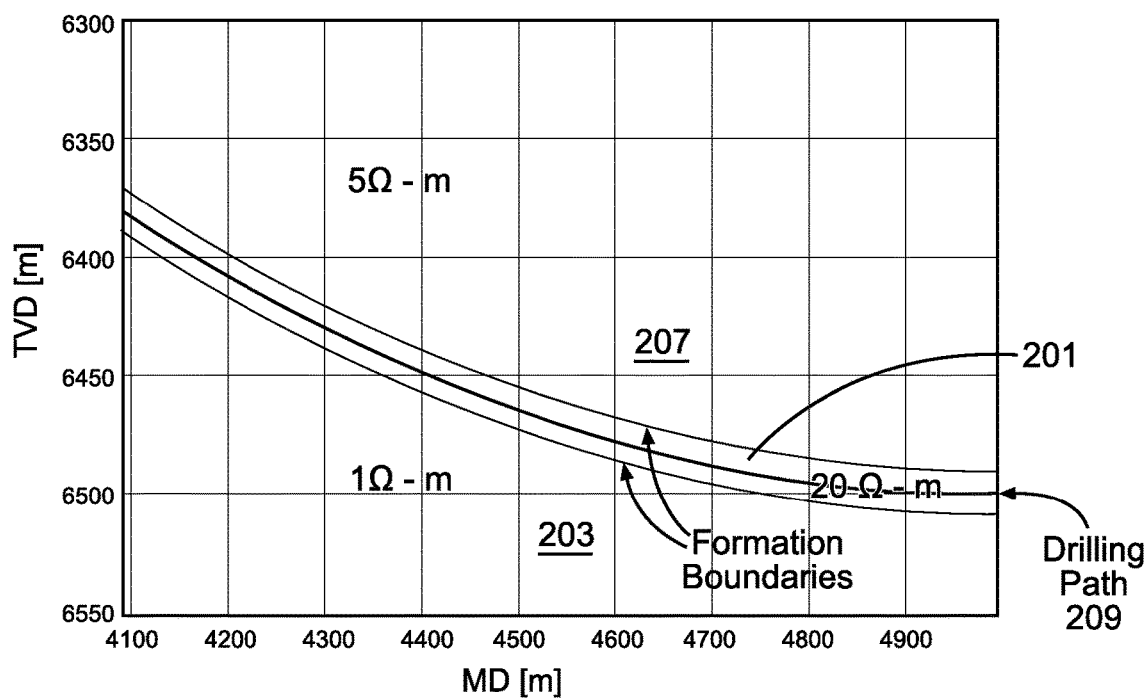
FIG. 2 shows an example of a drilling path in a three layer formation to consider visualization methods, in accordance with various embodiments.

To demonstrate visualization methods taught herein, a resistivity logging example in a three layer formation is considered. FIG. 2 shows formation geometry for this example in a three layer formation. Vertical axis represents the true vertical depth (TVD) and the horizontal axis shows the measured depth (MD) in meters. The measured data can alternatively be for a vertical section, i.e., a horizontal displacement of the tool from a reference point, in meters. Line 209 represents the drilling path of the tool parametrized by vertical section and TVD, where line 209 can be shown as a colored line such as a black line. It is assumed that the tool is in a formation layer 201 with a resistivity of 20 Ω-m and 18 m width. There are two semi-infinite shoulder beds, with the upper shoulder bed 207 having a resistivity of 5 Ω-m and the lower shoulder bed 203 having a resistivity of 1 Ω-m. The tool's distance from the bed boundaries are kept constant at 10 meters from the upper bed and 8 meters from the lower bed 203. It is assumed that tool is able to measure the resistivity of the formation layers as well as the distance to the bed boundaries (DTBB).

However, to better illustrate the errors and uncertainties in data inversion encountered in practical situations, some multiplicative noise was added in the simulated example to the inverted DTBB and resistivity results. The maximum amplitude of this noise was assumed to be a quarter of the amplitude of the inverted parameter. The mathematical equation describing this process is given in equation (1). In this equation, $P^M$ denotes the measured parameter, $P^R$ is the real value of the parameter and $u(-0.5, 0.5)$ represents a random variable with uniform distribution between $-0.5$ and $0.5$.

$$P^M = P^R \times [1 + u(-0.5, 0.5) \times 0.5] \qquad (1)$$

Figure 3:
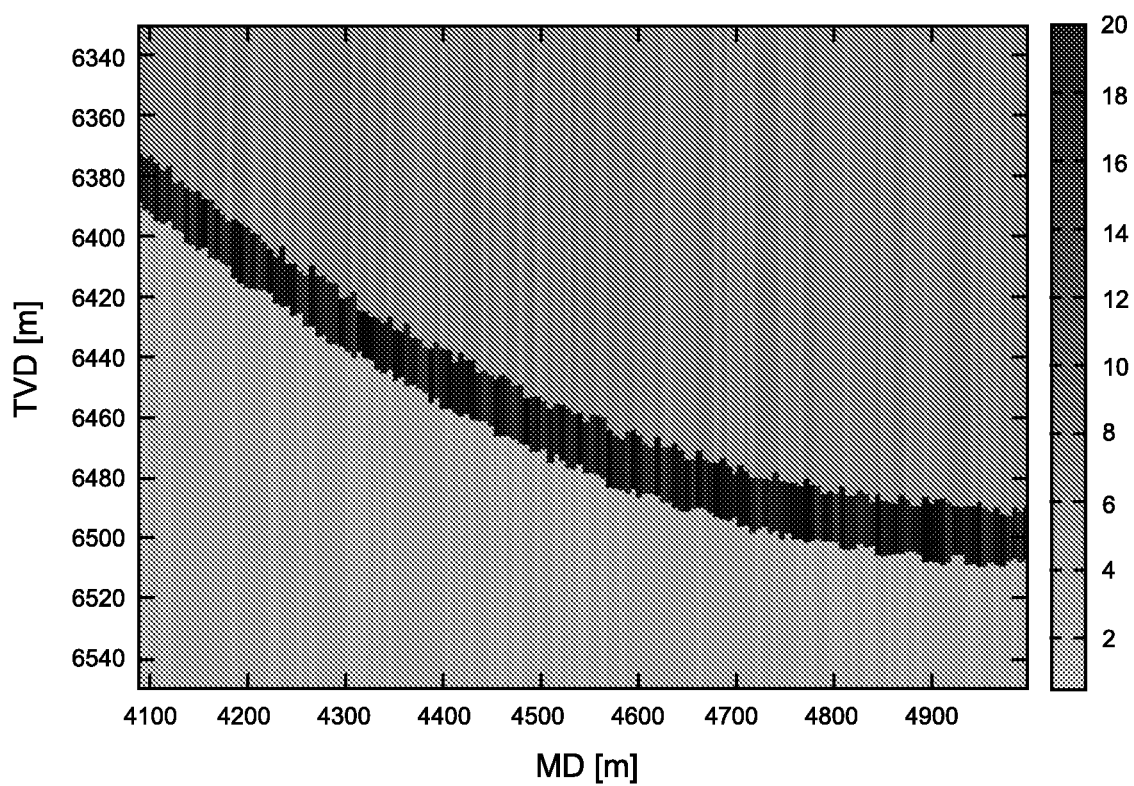
FIG. 3 shows an illustrative image of inverted resistivity value plotted as a function of the true vertical distance and the measured depth, in accordance with various embodiments.

A method to indicate the value of a formation parameter of interest that can be considered can include the mapping between amplitude of resistivity and a color scale. For example, the value of resistivity can be mapped to a color scale. FIG. 3 shows an image of inverted resistivity value plotted as a function of the TVD and the MD. For a particular point in space, color of the image can be used to indicate the value of the resistivity at that point. The mapping between the resistivity values of interest and a color palette can be shown as a bar plot on the right hand side of the plot. Variation of colors is shown in these figures in gray scale.

Color mapping is an intuitive mechanism of presenting data, because this method allows the user easily to distinguish formation layers, since formation layers with different properties can be represented with different colors. Thus, sharp discontinuities in the color tone can warn the user to the presence of a bed boundary. The image obtained with color mapping may be similar to what may be observed if a cross-section of the earth is taken at that region of space, further contributing to the intuitiveness of the plot. In various embodiments, color can be combined with text, orientation, size, or combinations thereof to provide visualizations of formation data. These visualizations of formation data can be a source of information to conduct operations with respect to the formation.

A method to indicate the value of a formation parameter of interest can include a mapping between the depth of investigation and color scale. In the example model considered in FIG. 2, the whole space is divided into three regions with the layer 201 in which the tool is located between the two shoulder beds 203 and 207. Obviously, actual formations are typically more complex than what is described in this model. However, the methods taught herein are not limited to formations having just three layers. Methods similar to or identical to methods discussed herein are applicable to any number of formation beds. Furthermore, borehole, invasion layer, etc. may similarly be visualized with the disclosed methods. However, in some practical situations, since a tool may have a limited depth of investigation, it may be preferable to model the formation to consist of a small number of layers to reduce the complexity of analysis. Depth of investigation is also an important parameter to the user of a graphical interface because it helps the user understand which region of space data is more accurate and where it is more unreliable.

Figure 4:
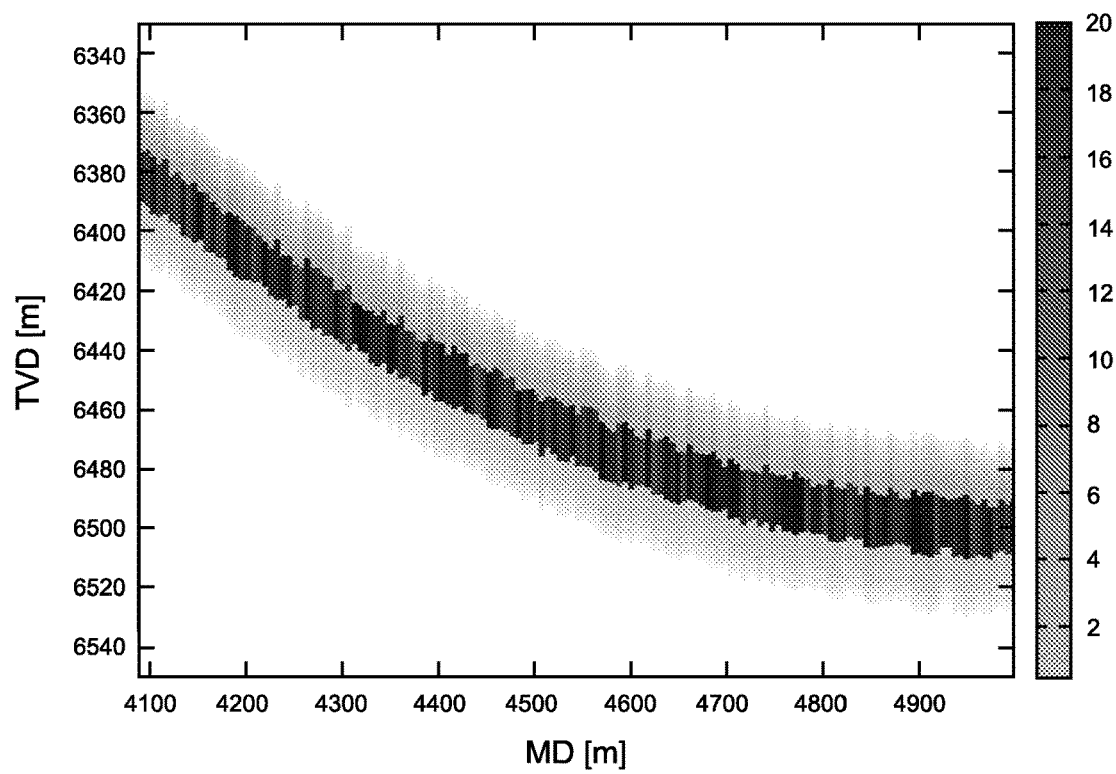
FIG. 4 shows mapping of resistivity values to a color scale, where the transparency of the colors are dependent on the depth of investigation of the measuring tool, in accordance with various embodiments.

A method to describe the depth of investigation can use the image's color property, such as transparency. Here, transparency is defined as a monotonic transition between any color and a color of the background. In regions where the data is known to be accurate, the image may be solidly presented, while in the regions where the tool is unreliable the image may be made opaque. Thus, colors on the image may fade out depending on the confidence level, which in turn can be based on the depth of investigation of the tool. This method, as with other methods, may be combined with other visualization methods described herein. For example, FIG. 4 shows the color mapping (in gray scale) of the data depicted in FIG. 3 replotted by applying a transparency mapping algorithm. Depth of investigation of the tool in this modeled example was chosen to be around 25 meters. In the regions further from the tool, colors can be slowly faded out and finally blended with the background at a certain distance where the tool becomes insensitive. Uncertainty in the data may also be presented in other ways. For example, colors may be assigned to represent data according to a scheme in which each color in a set of colors corresponds to a respective level of uncertainty (alternatively different respective confidence levels).

In various embodiments, visualizations can be based on mapping between the depth of investigation and pattern density. Depth of investigation (DOI) may be visualized using the correlation between the depth of investigation and pattern density. For example, regions where the pattern is denser may indicate areas where the tool is sensitive, while the regions where the pattern is sparser may correspond to a lower sensitivity. This change may be accomplished using a transition function that has the depth of investigation as a parameter. In an implementation, a sensitivity multiplier function s(d) may be defined as:

$$s(d) = \begin{cases} 1 & \text{if } d < DOI \\ e^{-\frac{(d-DOI)}{DOI}} & \text{if } d \geq DOI \end{cases} \quad (2)$$

In equation (2), d represents a distance from the tool. A sensitivity multiplier function may be used as a modifier of the original pattern density. Thus, until the plotted distance from the tool is equal to tool's depth of investigation, pattern density may be made equal to its original value and it may decrease exponentially after that.

In some implementations, it may be desired to correlate pattern density with some other parameter of interest. For example, mapping between resistivity and pattern size can be realized using a sensitivity multiplier function that may be given as:

$$s(d(x, y, z)) = \begin{cases} P(x, y, z) & \text{if } d < DOI \\ e^{-\frac{(d(x,y,z)-DOI)}{DOI}} \times P(x, y, z) & \text{if } d \geq DOI \end{cases} \quad (3)$$

In this equation, P(x, y, z) represents the parameter of interest at the point with coordinates (x, y, z). Thus, pattern density can convey, to a user, information on both the depth of investigation and another formation parameter of interest at the same time.

In various embodiments, visualizations can be based on mapping between the depth of investigation and pattern size. Depth of investigation of a tool may be visualized by applying a mapping function between the tool's depth of investigation and the size of a pattern. A sensitivity multiplier function similar to the one described in equation (2) may be used in such an implementation, which may modify the original size of the pattern. Thus, pattern size may be made vanishingly small for the regions far away from the sensitive region of the tool.

In various embodiments, visualization implementations can include the value of a formation parameter of interest mapped to a pattern. In general, this pattern may be any shape, as long as the mapping between the value of the parameter of interest and the particular pattern shape is specified. A straightforward implementation of a mapping between a pattern and a resistivity value has been conducted in previous studies. In various embodiments, mapping between a parameter, such as resistivity, and pattern type, density, size, or combinations thereof can be conducted.

Figure 5:
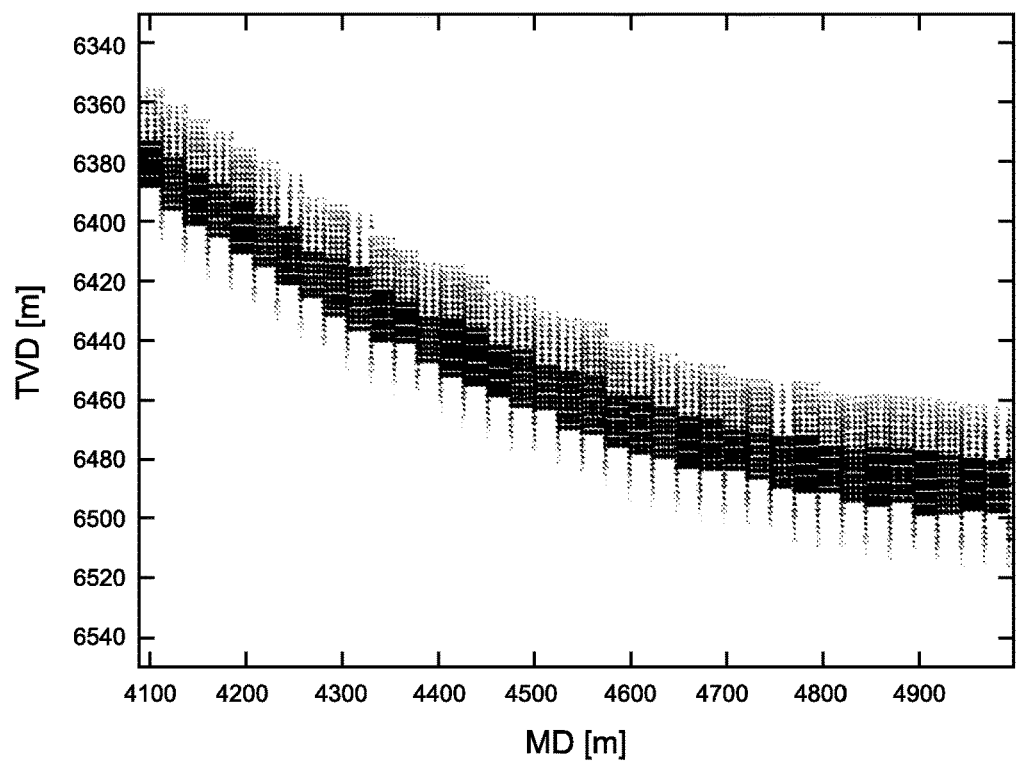
FIG. 5 shows a mapping of resistivity to dot density, in accordance with various embodiments.
Figure 6:
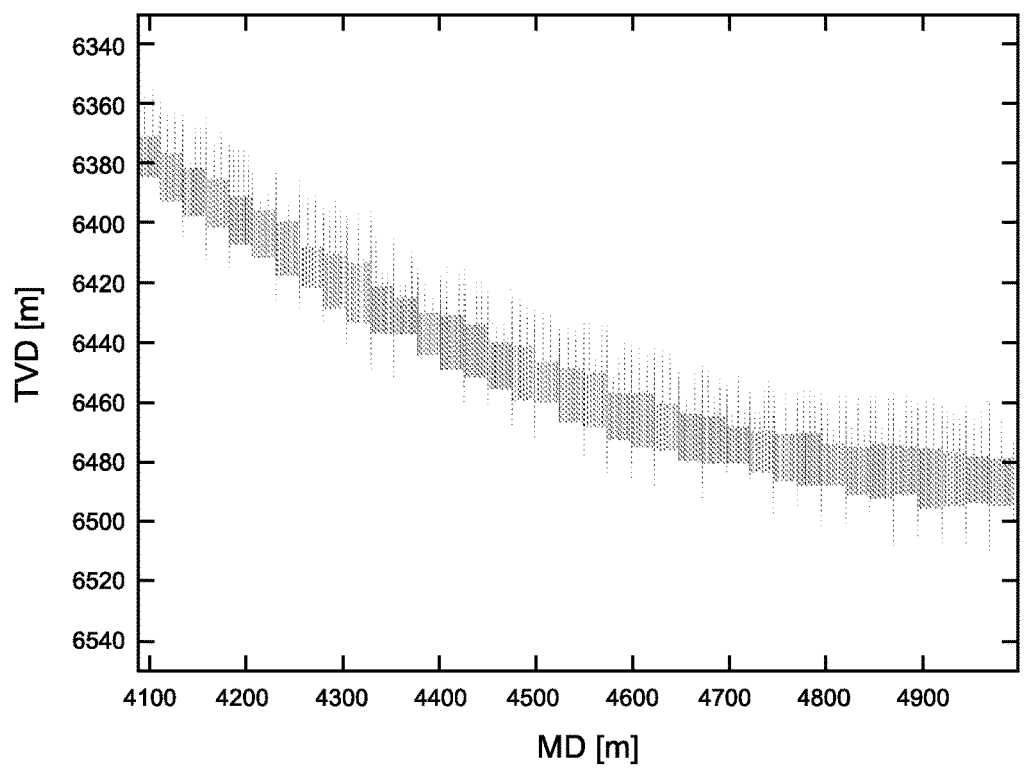
FIG. 6 shows a mapping of resistivity to line density, in accordance with various embodiments.
Figure 7:
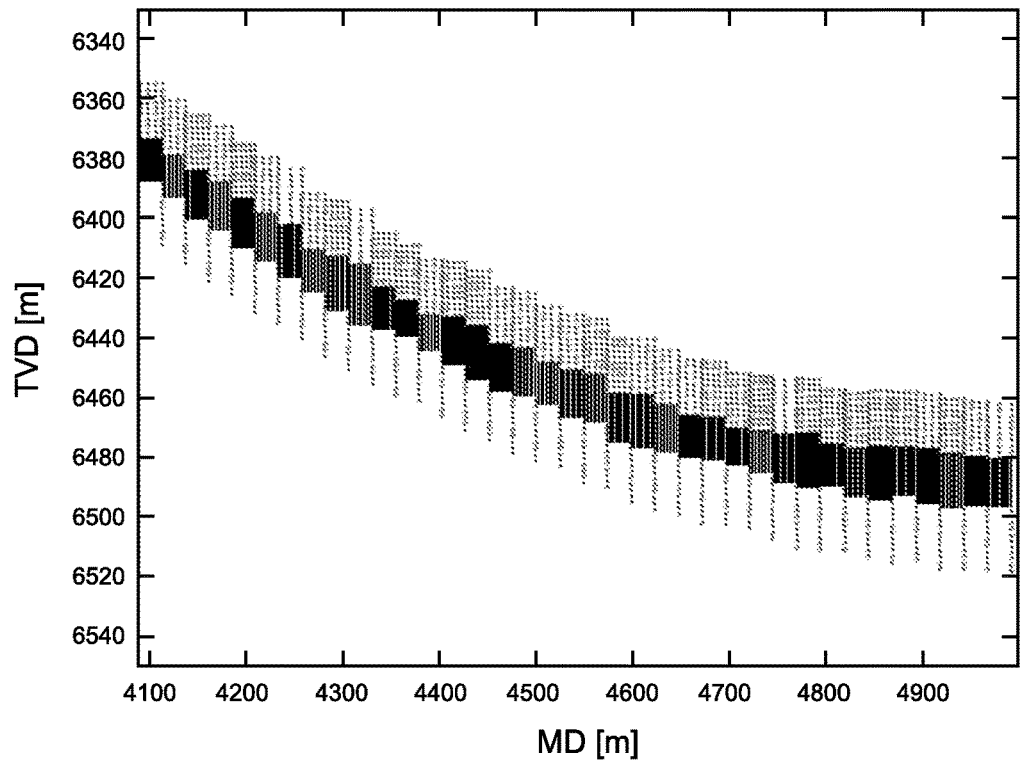
FIG. 7 shows a mapping of resistivity to density, where lines represent reservoir and dots represent non-reservoir layers, in accordance with various embodiments.

Embodiments of methods discussed herein can include an implementation of pattern mapping in which a pattern may consist of a single particular shape, such as dots or lines, and the density of the shape may be in proportion to the value of the parameter of interest. In another embodiment of a visualization implementation, a combination of different patterns and densities may be used. For example, dots may be used to represent sand layers and lines may be used to represent reservoir rocks, where the density of these dots and lines may show the value of the resistivity. Examples are shown in FIGS. 5, 6, and 7 for the formation geometry depicted in FIG. 2. In FIGS. 5 and 6, the measured resistivity is represented by the density of dots and lines, respectively. A user can easily distinguish the formation boundary from the sharp change in the density of the pattern. In FIG. 7, dots and lines are used collectively. Again, density of these patterns can represent the formation resistivity, lines represent the reservoir layer and dots represent non-reservoir shoulder beds. Variations in formation resistivity can be visualized by adjusting density of patterns. Thus, this method allows an operator to distinguish reservoir and non-reservoir layers and resistivity values of the layers in one plot. Furthermore, information regarding the depth of investigation of the tool is also available from the transparency of the image as described previously.

Figure 8:
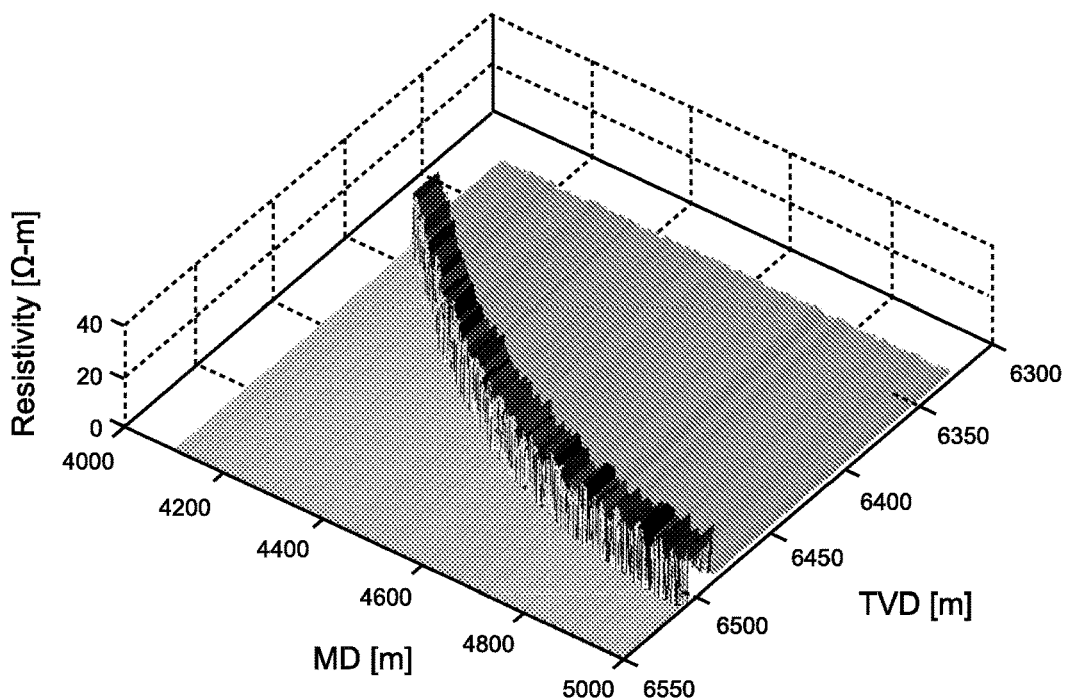
FIG. 8 shows a visualization implementing height mapping, in accordance with various embodiments.

In various embodiments, visualization schemes can include mapping a formation parameter of interest to the height axis of an image. For example, the scheme may be a mapping between resistivity and height. Such a method allows users to better gauge the difference between formation parameters of interest, as well as easily distinguish different beds and bed boundaries. FIG. 8 shows a visualization implementing height mapping for the example formation depicted in FIG. 2. In FIG. 8, x-axis and y-axis of the three dimensional grid represent TVD and MD, while the value of the data in the height axis is directly proportional to the formation resistivity at that point. Note that contour lines may also be used to map the formation parameter of interest to height.

Figure 9A:
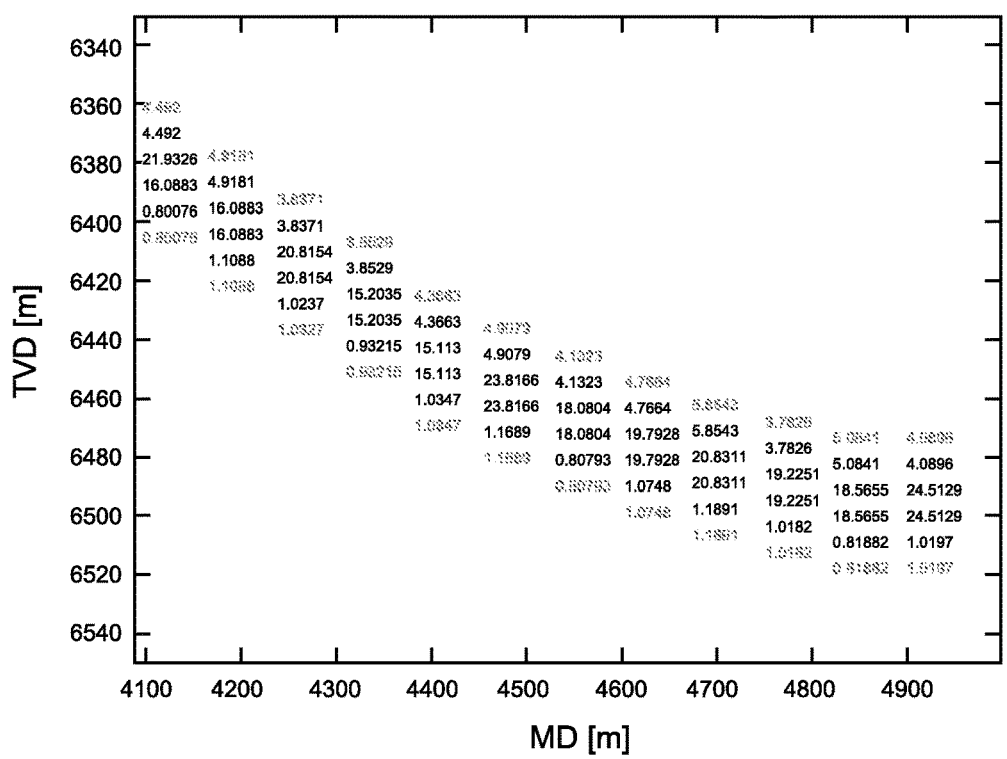
FIG. 9A-B illustrate a direct mapping of values of a formation parameter of interest, in accordance with various embodiments.

In various embodiments, visualization schemes can include mapping between a formation parameter, such as but not limited to resistivity, and text. In some cases, an operator may be interested in the exact value of the formation parameter of interest. In those cases, rather than mapping a value to a color or pattern, an image of the value of the parameter may be presented directly. FIG. 9A illustrates a direct mapping of values of a formation parameter of interest to an associated set of characters. The image may be entirely composed of text, where text associated with the values may comprise a grid. For example, this method is illustrated for the formation example of FIG. 2. Transparency mapping based on the tool's depth of investigation is also used in FIG. 9A. A user may easily read and use the resistivity value at a particular point in space using such a visualization method. In addition, size or color of individual text can be used to differentiate difference resistivity values. For example, at MD of 4200 m in FIG. 9A, a text size of 8 and/or blue color can be used to present resistivity of 4.9181 Ω·m, a text size of 10 and/or red color can be used to present resistivity of 16.0883 Ω·m, and a text size of 6 and/or yellow color can be used to present resistivity of 1.1088 Ω·m. Other color mapping techniques can be used in conjunction with utilization of text characteristics.

Figure 9B:
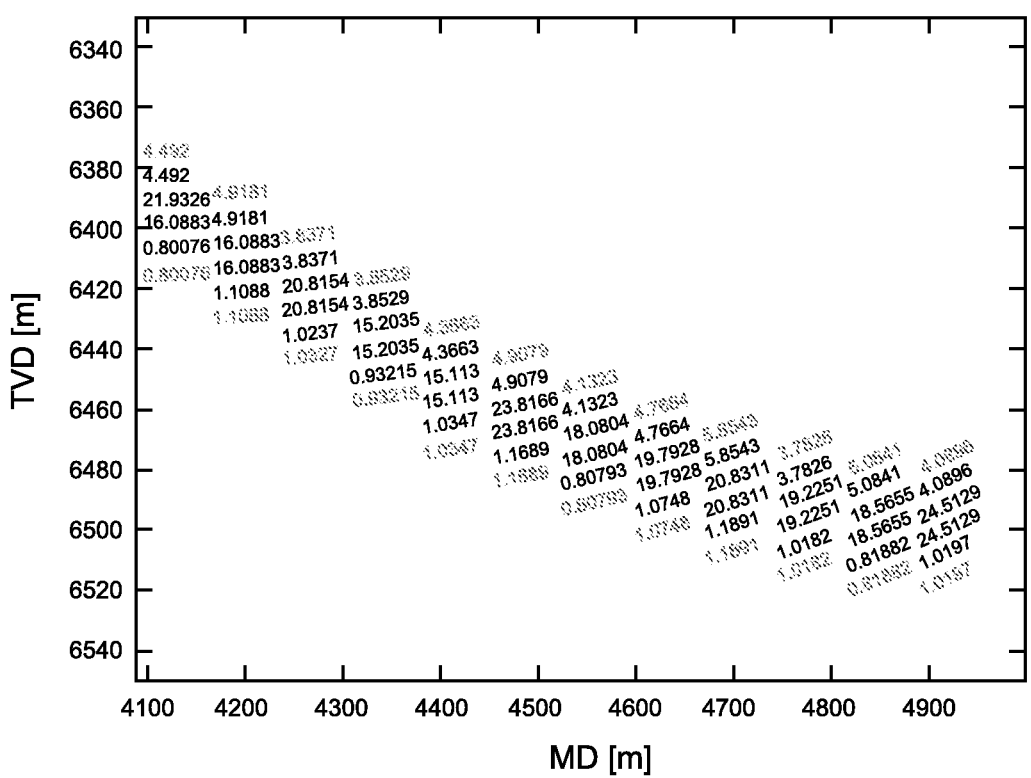

FIG. 9B also illustrates a direct mapping of values of a formation parameter of interest to an associated set of characters. The image may be entirely composed of text, where text associated with the values may comprise a gird. For example, this method is illustrated for the formation example of FIG. 2. Transparency mapping based on the tool's depth of investigation is also used in FIG. 9B. Features that adjust individual text orientation can be used to indicate bed dip. As shown in FIG. 9B, the bed dip increases as TVD increases. The text orientation can be utilized to indicate the bed dip at each depth. In other visualizations, orientation of the visualization structures being used to represent a formation property can be used to provide information on other characteristics of the formation property.

Figure 10:
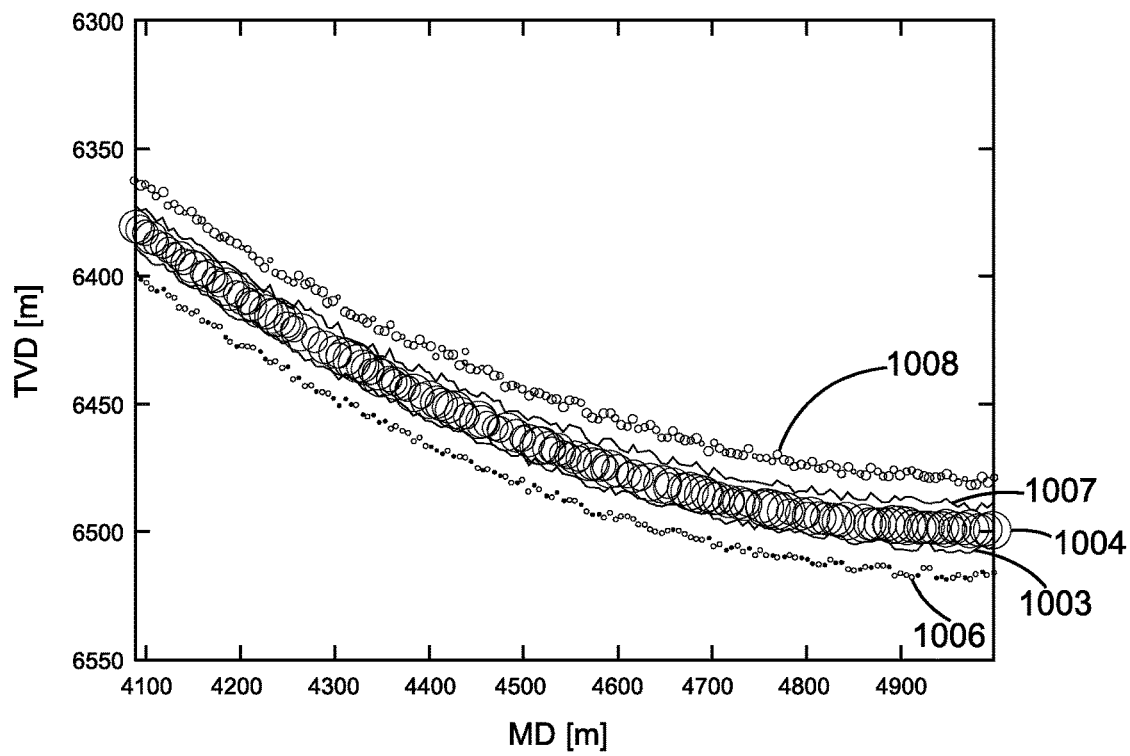
FIG. 10 illustrates mapping a formation parameter to the size of a shape, in accordance with various embodiments.

In various embodiments, visualization schemes can include mapping between a formation parameter, such as but not limited to resistivity, and one-dimensional (1D) pattern type, density, size, or combinations thereof. FIG. 10 illustrates mapping a formation parameter to the size of a shape. In this figure, inverted boundary locations are plotted as lines 1003 and 1007, which can be presented by a color such as blue. The formation parameters, such resistivity, of the layers are shown using bubbles 1004, 1006, and 1008, where the size of the bubbles increase in proportion to the resistivity value. Bubbles 1004, 1006, and 1008 can be presented by another color such as red.

Figure 11:
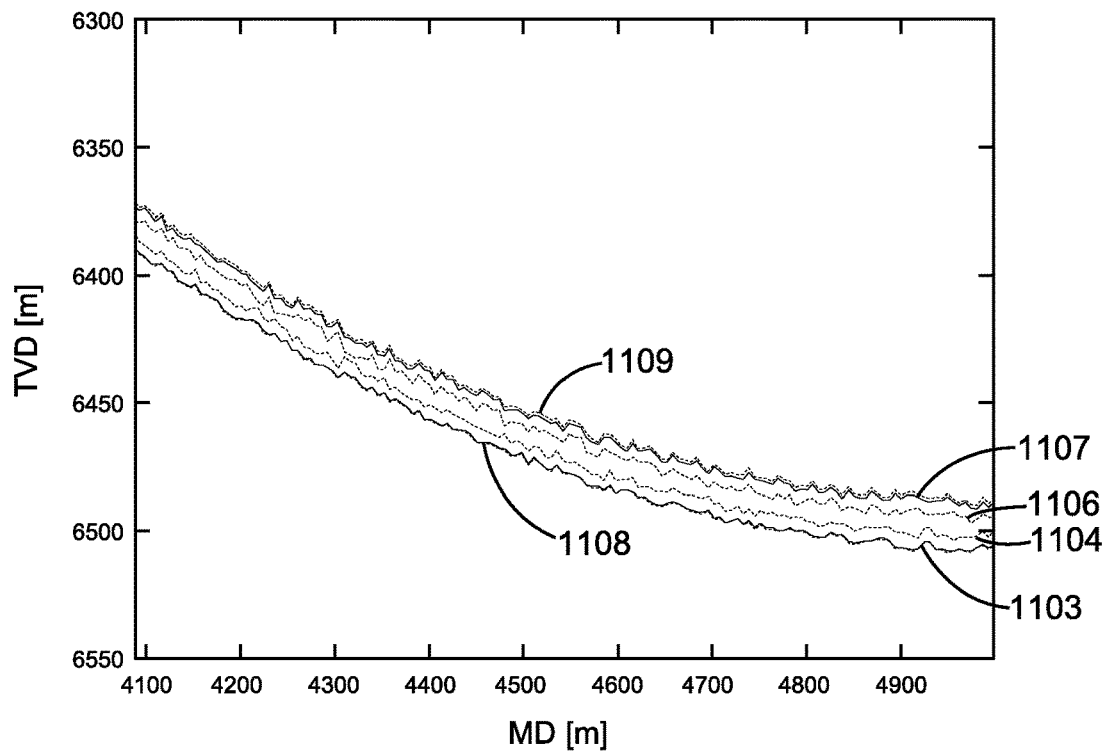
FIG. 11 illustrates mapping a formation parameter to distance from a boundary, in accordance with various embodiments.

In various embodiments, visualization schemes can include mapping between a formation parameter, such as but not limited to resistivity, and a plotted distance to boundary curve as illustrated in FIG. 11. In FIG. 11, lines 1103 and 1107 indicating the formation boundaries can be represented by a color such as blue. Lines 1104, 1106, 1108, and 1109 in this plot can be displayed in another color such as red lines. The plotted distance of the red lines (1104, 1106, 1108, or 1109) to a boundary (blue lines 1103 and 1107) indicates the resistivity of the layer in which the lines are located.

Although a simple three layer formation model is used in the examples presented herein, the use of this model does not limit the use of the methods described herein. Methods may be applied to any formation parameter of interest, or a combination of parameters. For example, for anisotropic formations, resistivity in vertical and horizontal directions may be presented separately or for some methods, for example, direct mapping to the value method, both of these resistivities may be presented on a single image. Furthermore, these visualization methods may be used alone or in conjunction with each other. Some methods may also be extended to higher dimensions; for example, color mapping can be applied to a three dimensional plot.

Figure 12:
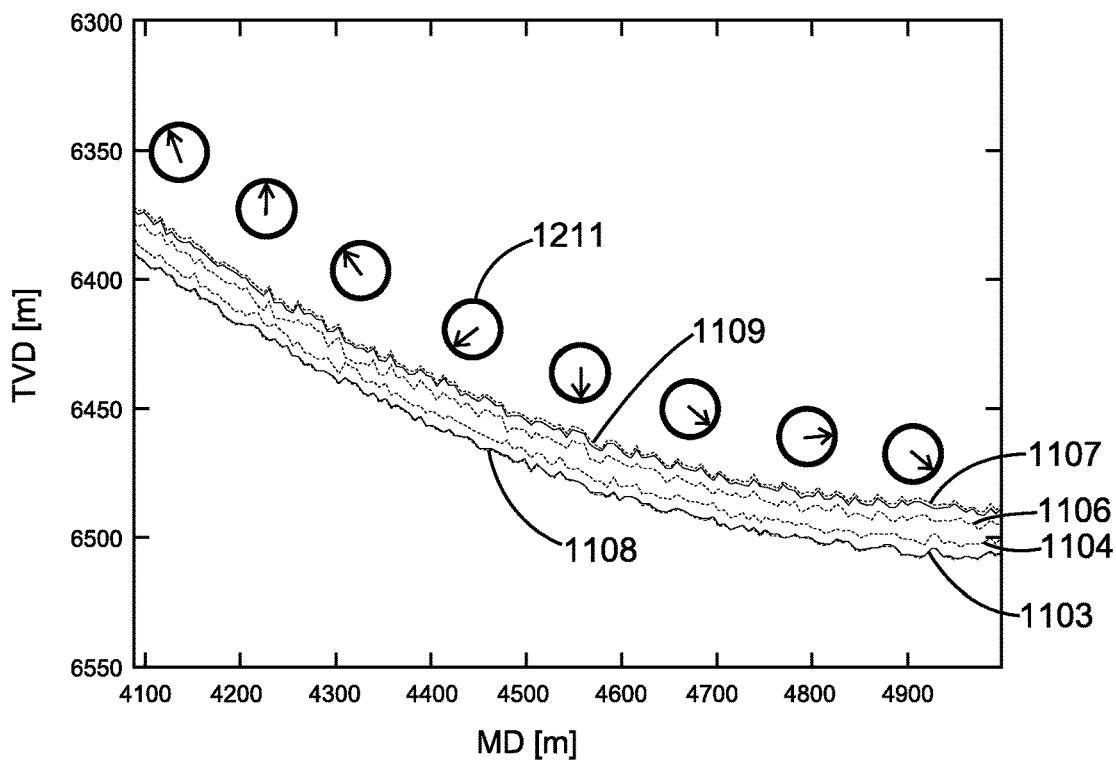
FIG. 12 illustrates a scheme displaying azimuth information using objects oriented at a specific angle, in accordance with various embodiments.

In geosteering applications, it may be desirable to present azimuth information as well. In various embodiments, orientation of shapes for presenting azimuth information can be combined with mapping between a formation parameter, such as but not limited to resistivity, and a plotted distance to boundary curve. FIG. 12 illustrates a scheme displaying azimuth information using objects oriented at a specific angle combined with a mapping between a formation parameter, such as but not limited to resistivity, and a plotted distance to boundary curve as illustrated in FIG. 11. For example, objects 1211, such as circles with embedded lines that convey azimuth information, can be added to lines 1103 and 1107 that indicate the formation boundaries and lines 1104, 1106, 1108, and 1109 related to resistivity. The circles 1211 with embedded lines may be displayed with a color, such as red, that is different from that of the formation boundaries. Each embedded line or arrow indicates the direction that is the shortest distance to a bed at the corresponding point on the path of the measuring tool. Note that other visualization methods may possibly be used to display the azimuth angle.

Figure 13:
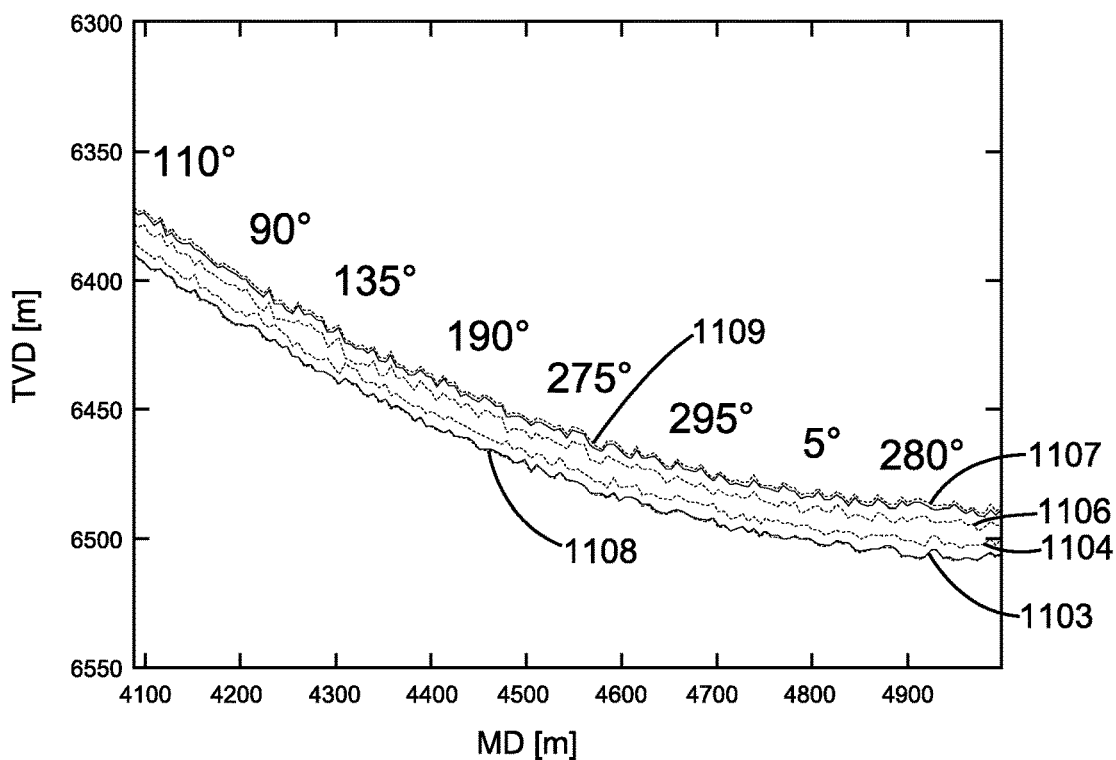
FIG. 13 illustrates a scheme displaying azimuth information using text, in accordance with various embodiments.

For example, azimuth angle may be directly displayed as a text with lines 1103 and 1107 indicating the formation boundaries and lines 1104, 1106, 1108, and 1109 related to resistivity as shown in FIG. 13. Each text displaying the azimuthal angle indicates the direction that is the shortest plotted distance to a bed at the corresponding point on the path of the measuring tool. In various implementations, a user may operate a pointer device (a computer mouse, a touch activated screen, or other such selecting mechanism) to select or click on a point on the log to obtain azimuth information or any other desired parameter of interest corresponding to that point. Information may be overlaid on the existing figure. Text may be used to present this information, or a combination of other methods such as patterns or colors may be employed.

In various embodiments, visualization schemes can include mapping between bed and boundary parameters and 1D pattern color and shape. For DTBB applications, the maximum distance between the measurement tool and the shoulder-bed(s) that the tool can detect is limited. Nevertheless, using different formation resistivity, relative dip angle, operation parameters of the tools, etc., the tools may be able to determine one or more shoulder-beds surrounding the tools.

Figure 14:
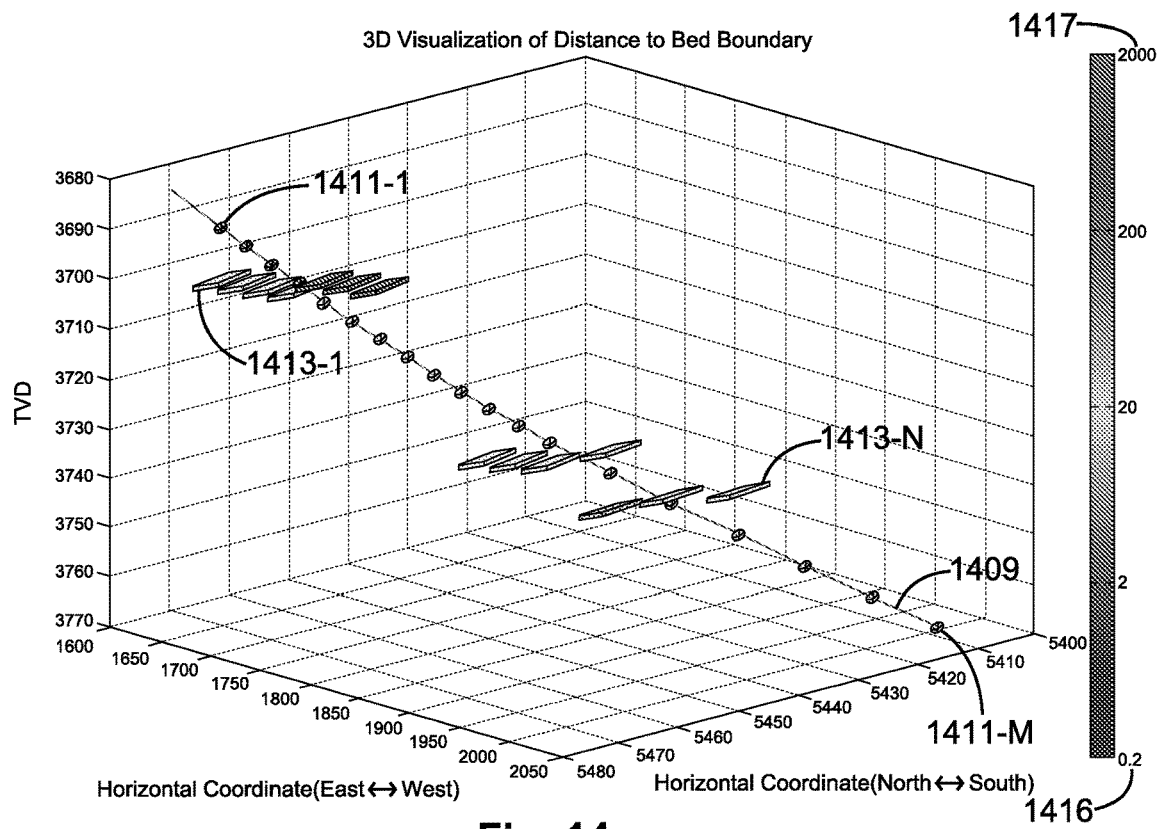
FIG. 14 illustrates a three-dimensional visualization of distance to bed boundary inversion, in accordance with various embodiments.

FIG. 14 presents a 3D visualization of DTBB inversion results by using (1) a line 1409 to describe the wellbore deviation and drilling path, which may be displayed by a color such as blue, (2) one or more spheres 1411-1 . . . 1411-M to present current bed resistivity reading at the respective depths, which may be a colored sphere, and (3) multiple rectangular prisms 1413-1 . . . 1413-N to indicate all shoulder-beds within the tool maximum detection range, which may be multiple colored rectangular prisms. The color of spheres and the prisms can correspond to the resistivity value stated in the color bar in FIG. 14. The color bar may range from a low value 1416 in one color, such as blue, through several colors to a high value 1417 in another color, such as red. In addition, users can clearly read the resistivity value of each sphere or prism by selecting their positions with a user interface device such as a mouse for a computer display, a touch activated screen, or other selecting device for a user interface. Users also are able to display the DTBB as shown in FIG. 15, or display bed dip angle, bed azimuth angle at each rectangular cuboid.

Figure 15:
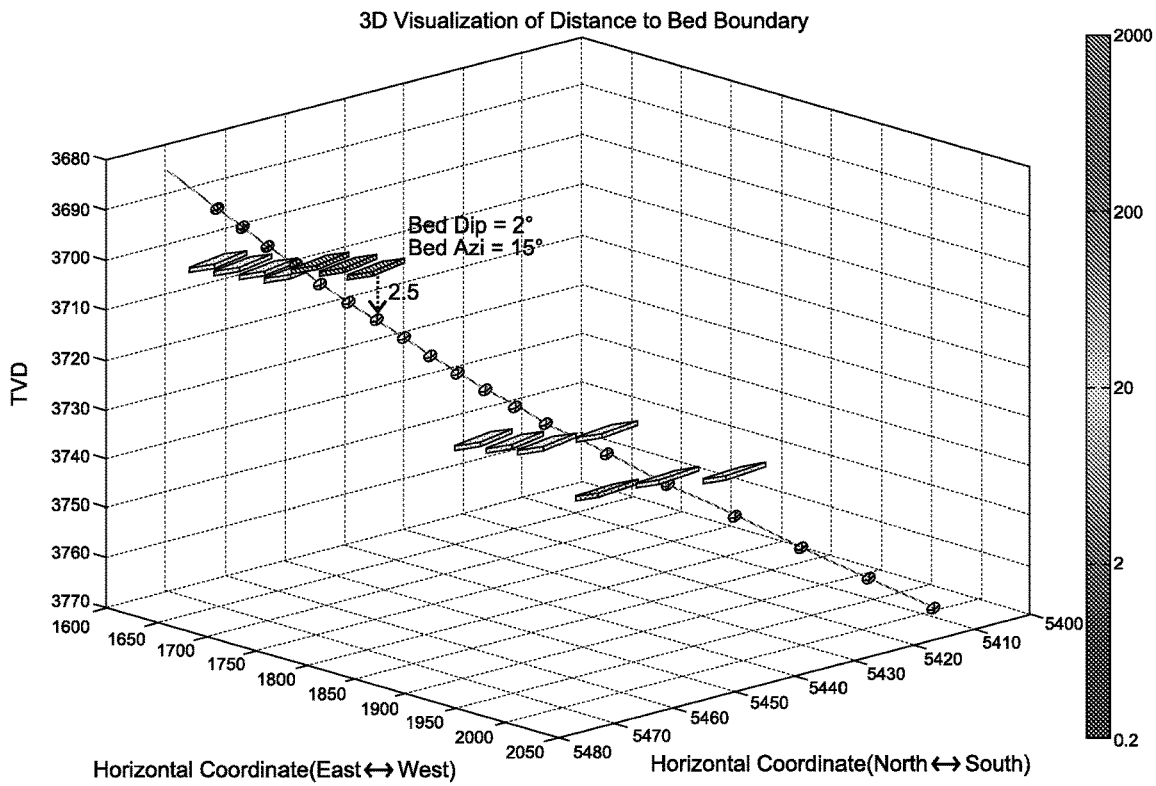
FIG. 15 illustrates a three-dimensional visualization of distance to bed boundary inversion, in accordance with various embodiments.
Figure 16A:
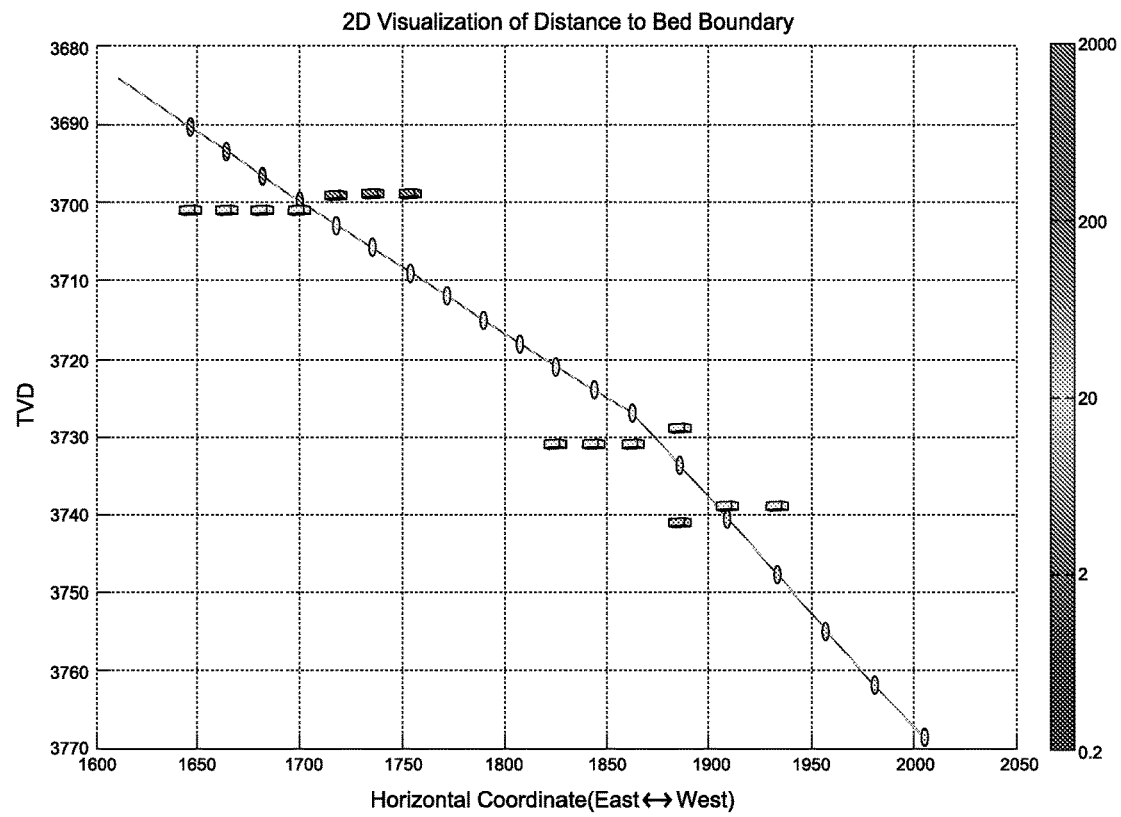
FIGS. 16A-C illustrate two-dimensional visualizations of distance to bed boundary, in accordance with various embodiments.
Figure 16B:
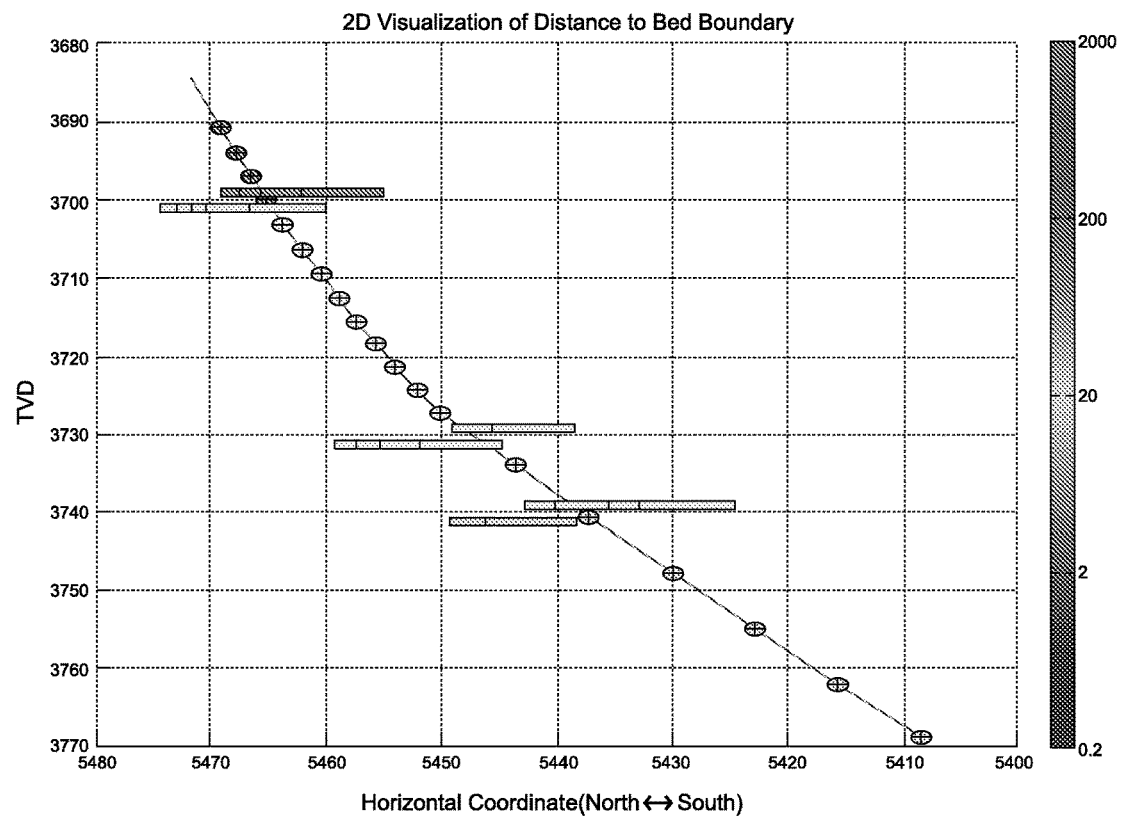
Figure 16C:
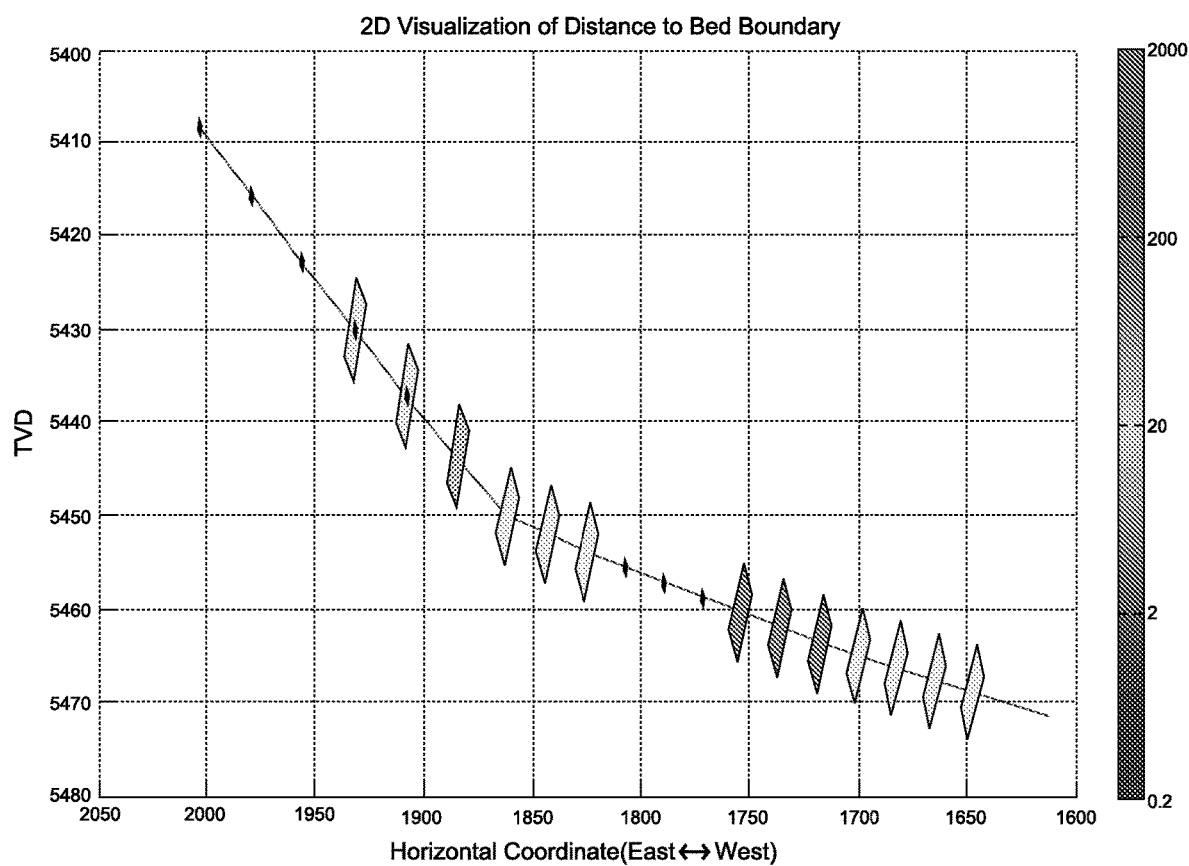

The 3D plot of FIG. 15 can be also rotated as several 2D plots at the same time. FIGS. 16A-C illustrate two-dimensional visualizations of plotted distance to bed boundary. Users will be able to understand the wellbore deviation based on FIG. 16A and FIG. 16B, and drilling azimuth angle based on FIG. 16C. By checking the inverted results using 3D and 2D plots, users can be informed about the tool's location and the formation layers surrounding the tool at distinct depths in real time.

In various embodiments, visualization methods similar to or identical to visualization methods discussed herein can be implemented in a logging system. For example, geosteering is a system application where decisions based on data visualization may be fundamental for system operation. Geosteering represents a real-time system where quick decisions should be made based on the obtained data. In other systems, collected data may be stored and processed at a later time. The operating principles of such a system processing collected data may be different from a real-time system, though these differences may be slight.

Figure 17:
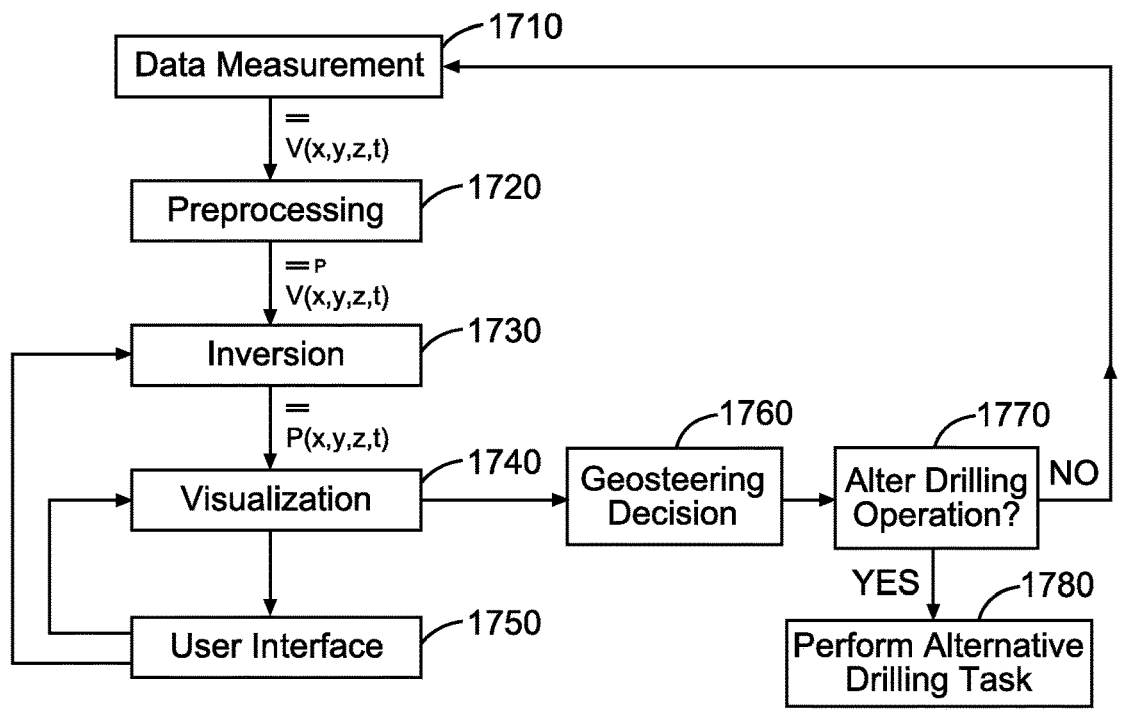
FIG. 17 illustrates features of an example method of operating a geosteering system, in accordance with various embodiments.

FIG. 17 illustrates features of an example method of operating a geosteering system as an example of a real-time application. At 1710, data measurement is conducted, where data is obtained as a function of position and time. Furthermore, data can also depend on tool parameters such as operating frequency and spacing between transmitter and the receiver sensor. Double bars over $\bar{\bar{V}}$(x, y, z, t) are meant to represent that measured data may be stored as a matrix for a multi-frequency and/or multi-spacing system. This measured data may then be preprocessed, at 1720, to obtain $\bar{\bar{V}}^P$ (x, y, z, t). Preprocessing of data may include compensating data for gain variations, normalizations, and other similar operations that are performed before the inversion step, at 1730. After inversion, a variety of parameters related to tool and formation properties may be passed to the visualization step, at 1740. These parameters, represented as the matrix $\bar{\bar{P}}$(x, y, z, t) in FIG. 17, may include bed dip(s), bed azimuth(s), number of layers, the resistivity of each layer, distance to bed boundary, mud resistivity, borehole diameter, highside of the tool, northside of the earth, invasion layers, etc. Not all of these parameters must necessarily be obtained via inversion; some parameters may be directly measured by an auxiliary tool and passed to the visualization step.

During visualization, one or more of the methods described here may be employed to present information to a user. User interaction can be provided using a user interface at 1750, where the user may select the type of plots on the screen, or as it is previously mentioned, in other embodiments, a user may select a particular point on the presented logs to obtain more detailed information about that point. A user may also adjust inversion parameters based on the visualized data; in that case, inversion can be applied again using the adjusted parameters and images presented to the user are replotted or updated. Examples of parameters that can be adjusted are weights of terms in the numerical optimization problem, numerical parameters of inversion such as maximum iterations or threshold for convergence, and selection of frequency or sensors used in the inversion. Based on the plots, an operator may make a geosteering decision at 1760, which may comprise changing the direction or speed of drilling Δt 1770, a decision regarding altering the drilling operation can be made. This decision can include stopping the drilling operation, changing a direction of the drilling operation, changing a speed of the drilling operation, or acquiring additional data to generate new values for a new visualization and new geosteering decision. At 1780, an alternative drilling task is performed; otherwise the above steps may be repeated to take measurements providing additional data to generate new values for a new visualization and new geosteering decision. If the tool is at a desired location, drilling operations may stop.

Figure 18:
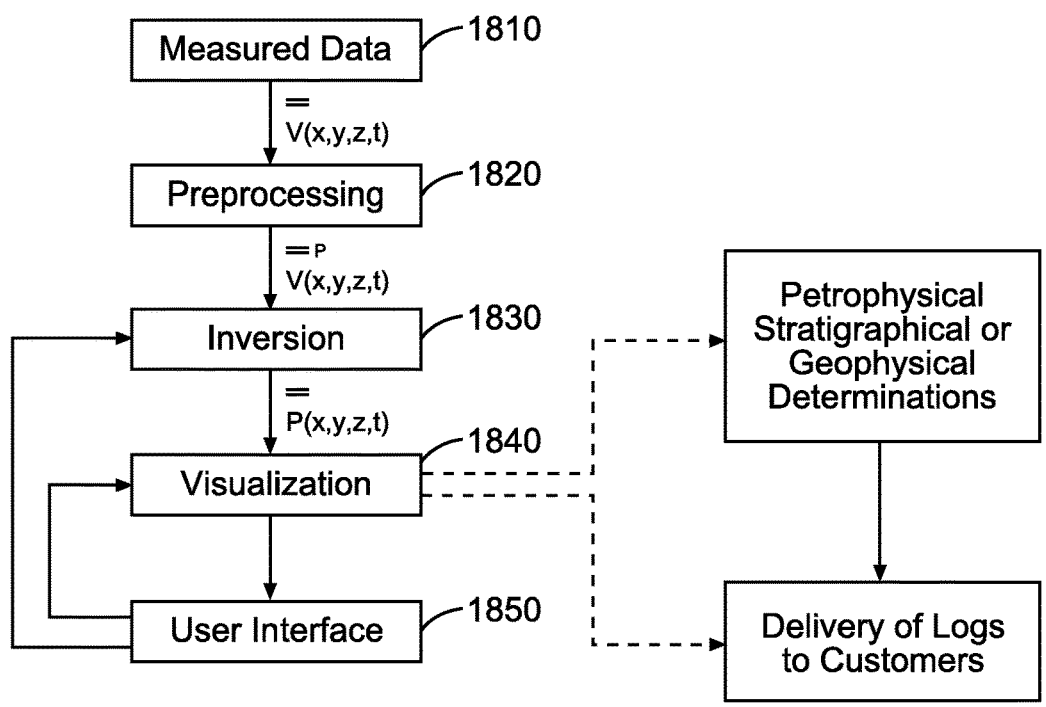
FIG. 18 illustrates features of an example method of operating a post-processing system, in accordance with various embodiments.

FIG. 18 illustrates features of an example method of operating a post-processing system. Overall operation of a system where the post-processing of data is applied is similar to the real-time system presented in FIG. 17. However, in this case, at 1810, it is assumed that data is already measured and stored previously. This measured data, $\bar{\bar{V}}$(x, y, z, t), may again come from a multi-frequency and/or a multi-spacing tool. Data is processed, at 1820, and inverted, at 1830, for layer resistivities, layer boundaries, and any other desired formation information, and visualized, at 1840. During visualization, one or more methods similar to or identical to schemes discussed herein may be employed. Again, the user may control the visualized data using an interface, at 1850; and if the results are not satisfactory user may update inversion parameters and reproduce the images. After satisfactory plots are obtained, petrophysical, stratigraphical, or geophysical determinations can be made based on the plots. Visualized data may be presented to a variety of entities including a customer. The determinations made by the operator may be used to regulate deliverables.

In various embodiments, one or more visualization schemes and systems arranged to implement such schemes can use a combination of patterns, text, and color to provide the information to make geosteering decisions. This information can be provided to a drilling engineer via an interactive user interface. Due to quality problems in inversion results, presentation of the results may be essential in making accurate geosteering decisions. One or more visualization schemes, as taught herein, may improve geosteering and formation evaluation decisions. These geosteering and formation evaluation decisions can allow an operator to place a well in a more productive zone without penetrating the reservoir boundaries. As a result, these decisions can achieve significant savings and increase value of propagation resistivity tools.

In various embodiments, a machine-readable storage device can have instructions stored thereon, which, when executed by one or more processors of a machine, cause the machine to perform operations, the operations comprising any of the features of methods of presenting information regarding a formation and conducting operations based on the information in a manner identical to or similar to the methods and schemes described herein. The instructions can include assigning values generated from measurement(s) to one or more types of visualization structures. The values may be the result of inversion applied to measured data with respect to formation properties, distances from a measuring tool to characteristic features of formations, or combinations thereof. Further, a machine-readable storage device, herein, is a physical device that stores data represented by physical structure within the device. Examples of machine-readable storage devices include, but are not limited to, read only memory (ROM), random access memory (RAM), a magnetic disk storage device, an optical storage device, a flash memory, and other electronic, magnetic, and/or optical memory devices.

In various embodiments, activities of an embodiment of an example method of visualizing formation related features can comprise: acquiring data related to a formation from measurements by a tool; generating a representation from the data by mapping depth of investigation to a color scale to which a transparency algorithm is applied; and displaying the representation such that a visualization of a property of the formation is provided. The acquired data can be measurement data collected from the tool and processed. The acquired data can be data resulting from the processing of measurement data collected from the tool. The processing of the measurement data may include conducting inversion operations on the measurement data or derived data from the measurement data. The transparency algorithm can provide a color image such that colors fade out depending on a confidence level corresponding to the data. The confidence level can be based on the depth of investigation. The confidence level can be based on other information including but not limited to the measurement data, the characteristics of the tool that makes the measurement, historical data stored in databases, or combinations thereof.

In various embodiments, activities of an embodiment of an example method of visualizing formation related features can comprise: acquiring data related to a formation from measurements by a tool; generating a representation from the data by a mapping between depth of investigation and one or more of a pattern density or a pattern size; and displaying the representation such that a visualization of a property of the formation is provided. The acquired data can be measurement data collected from the tool and processed. The acquired data can be data resulting from the processing of measurement data collected from the tool. The processing of the measurement data may include conducting inversion operations on the measurement data or derived data from the measurement data. The method can include applying a sensitivity multiplier function to the one or more of pattern density or pattern size. The sensitivity multiplier function can be generated as $$s(d) = \begin{cases} 1 & \text{if } d < DOI \\ e^{-\frac{(d-DOI)}{DOI}} & \text{if } d \geq DOI \end{cases},$$

where d represents a distance from the tool and DOI is depth of investigation. Generating the representation can include correlating a parameter of interest with the one or more of pattern density or pattern size. The method can include applying a sensitivity multiplier function with respect to the parameter of interest. The sensitivity multiplier function with respect to the parameter of interest can be generated as $$s(d(x, y, z)) = \begin{cases} P(x, y, z) & \text{if } d < DOI \\ e^{-\frac{(d(x,y,z)-DOI)}{DOI}} \times P(x, y, z) & \text{if } d \geq DOI \end{cases},$$

where d(x, y, z) represents distance from the tool, DOI is depth of investigation, and P(x, y, z) represents the parameter of interest with coordinates (x, y, z).

In various embodiments, activities of an embodiment of an example method of visualizing formation related features can comprise: acquiring data related to a formation from measurements by a tool; generating a representation from the data by a mapping between a formation property and pattern types along with a pattern density or a pattern size; and displaying the representation such that a visualization of the formation property is provided. The acquired data can be measurement data collected from the tool and processed. The acquired data can be data resulting from the processing of measurement data collected from the tool. The processing of the measurement data may include conducting inversion operations on the measurement data or derived data from the measurement data. The pattern types can include a dot and a line. The method can include mapping resistivity to a dot density. The method can include mapping resistivity to a line density. The method can include using lines, dots, a density of the lines, a density of the dots such that lines represent a reservoir layer, dots represent non-reservoir shoulder beds, a density of the lines indicates a value of a formation property of the reservoir layer, and a density of dots represent a value of the formation property of the non-reservoir shoulder beds. The formation property visualized can be resistivity.

In various embodiments, activities of an embodiment of an example method of visualizing formation related features can comprise: acquiring data related to a formation from measurements by a tool; generating a representation from the data by a three-dimensional mapping between a formation property and a height of an image; and displaying the representation such that a visualization of the formation property is provided. The acquired data can be measurement data collected from the tool and processed. The acquired data can be data resulting from the processing of measurement data collected from the tool. The processing of the measurement data may include conducting inversion operations on the measurement data or derived data from the measurement data. The height can be represented along a path. Contour lines can be used to map the height along the path.

In various embodiments, activities of an embodiment of an example method of visualizing formation related features can comprise: acquiring data related to a formation from measurements by a tool; generating a representation from the data by a mapping between a formation property and text; positioning the text in a plot based on measured or estimated physical location of the formation property that it is being indicated by the text; and displaying the representation such that a visualization of the formation property is provided. The acquired data can be measurement data collected from the tool and processed. The acquired data can be data resulting from the processing of measurement data collected from the tool. The processing of the measurement data may include conducting inversion operations on the measurement data or derived data from the measurement data. A transparency function can be applied to the text. In an embodiment, representation of the formation may only consist of text with no other graphical objects. The text can be mapped to a gird. The grid may be uniform in an x-axis direction as an abscissa of the plot. Variation of font size of the text can represent variation of the acquired data or the formation property. The method can include adjusting orientation of individual text to indicate bed dip. The text may indicate a resistivity value of the formation. The text may indicate a plotted distance value to a formation boundary.

In various embodiments, activities of an embodiment of an example method of visualizing formation related features can comprise: acquiring data related to a formation from measurements by a tool; generating a representation from the data by a mapping between a formation property and a size of a shape; and displaying the representation such that a visualization of the formation property is provided. The acquired data can be measurement data collected from the tool and processed. The acquired data can be data resulting from the processing of measurement data collected from the tool. The processing of the measurement data may include conducting inversion operations on the measurement data or derived data from the measurement data. The formation property can be resistivity and the size of the shapes can vary in proportion to variation of the resistivity.

In various embodiments, activities of an embodiment of an example method of visualizing formation related features can comprise: acquiring data related to a formation from measurements by a tool; generating a representation from the data by mapping a formation property to plotted distance from a formation boundary; and displaying the representation such that a visualization of the formation property is provided. The acquired data can be measurement data collected from the tool and processed. The acquired data can be data resulting from the processing of measurement data collected from the tool. The processing of the measurement data may include conducting inversion operations on the measurement data or derived data from the measurement data. Generating the representation can include assigning a color to formation boundaries and mapping lines with another color such that the lines are placed at plotted distances from formation boundaries indicating values of the formation property. Generating the representation can include adding arrows or text that indicates a direction that is the shortest distance to a bed at a point corresponding to a path of the tool.

In various embodiments, activities of an embodiment of an example method of visualizing formation related features can comprise: acquiring data related to a formation from measurements by a tool; generating a representation from the data by forming a three-dimensional mapping using a line having a fixed color to describe a drilling path, shapes representing a formation property reading at respective depths with each shape having a color mapped to a color bar corresponding to its respective value of the formation property, the color bar ranging over values of the formation property, and other shapes indicating shoulder-beds within a maximum detection range of the tool with each of the other shapes having a color mapped to the color bar corresponding to its respective value of the formation property; and displaying the representation such that a visualization of the formation property is provided. The acquired data can be measurement data collected from the tool and processed. The acquired data can be data resulting from the processing of measurement data collected from the tool. The processing of the measurement data may include conducting inversion operations on the measurement data or derived data from the measurement data. The three-dimensional mapping can be rotated providing a number of two-dimensional mappings concurrently.

In various embodiments, activities of an embodiment of an example method of conducting geosteering functions can include using any of the example methods of visualizing formation related features discussed herein and performing additional operations. The additional operations can include: providing the visualization to an interactive user interface; receiving inputs from the interactive user interface; operating on the inputs, generating an output visualization providing information to make a geosteering decision; and outputting a signal representing the geosteering decision. The method can include generating another visualization based on the received inputs, providing the information to make the geosteering decision. The received inputs can include information to adjust inversion of the data to generate the other visualization. The geosteering decision can include stopping a drilling operation, changing a direction of the drilling operation, changing a speed of the drilling operation, or taking additional data to generate new values for a new visualization and new geosteering decision.

In various embodiments, activities of an embodiment of an example method of conducting analysis functions can include using any of the example methods of visualizing formation related features discussed herein and performing additional operations. The additional operations can include: accessing a data storage unit to collect the data; providing the visualization to an interactive user interface; receiving inputs from the interactive user interface; operating on the inputs, generating an output visualization providing information to make a petrophysical, stratigraphical, or geophysical determination or to generate logs of one or more formation properties. The method can include generating another visualization based on the received inputs. The received inputs can include information to adjust inversion of the data to generate the other visualization.

In various embodiments, acquiring data in any of the example methods of visualizing formation related features discussed herein can include acquiring results of an inversion of one or more of a formation parameter or a distance. The formation parameter can be resistivity of a formation. With respect to any of the example methods of visualizing formation related features discussed herein, a machine-readable storage device having instructions stored thereon, which, when executed by one or more processors of a machine, can cause the machine to perform operations, the operations comprising any of the example methods of visualizing formation related features discussed herein.

A system can comprise: one or more processors; a user interface operable with the one or more processors; and a data processing unit operable with the user interface, wherein the one or more processors, the user interface, and the data processing unit are structured to operate according to any of the example methods of visualizing formation related features discussed herein. The system can include the tool to measure the data. The system can include a touch screen operable with the user interface to provide user inputs to operate the data processing unit. The system can include a computer mouse operable with the user interface to provide user inputs to operate the data processing unit. The system can be compatible with a logging while drilling operation.

Figure 19:
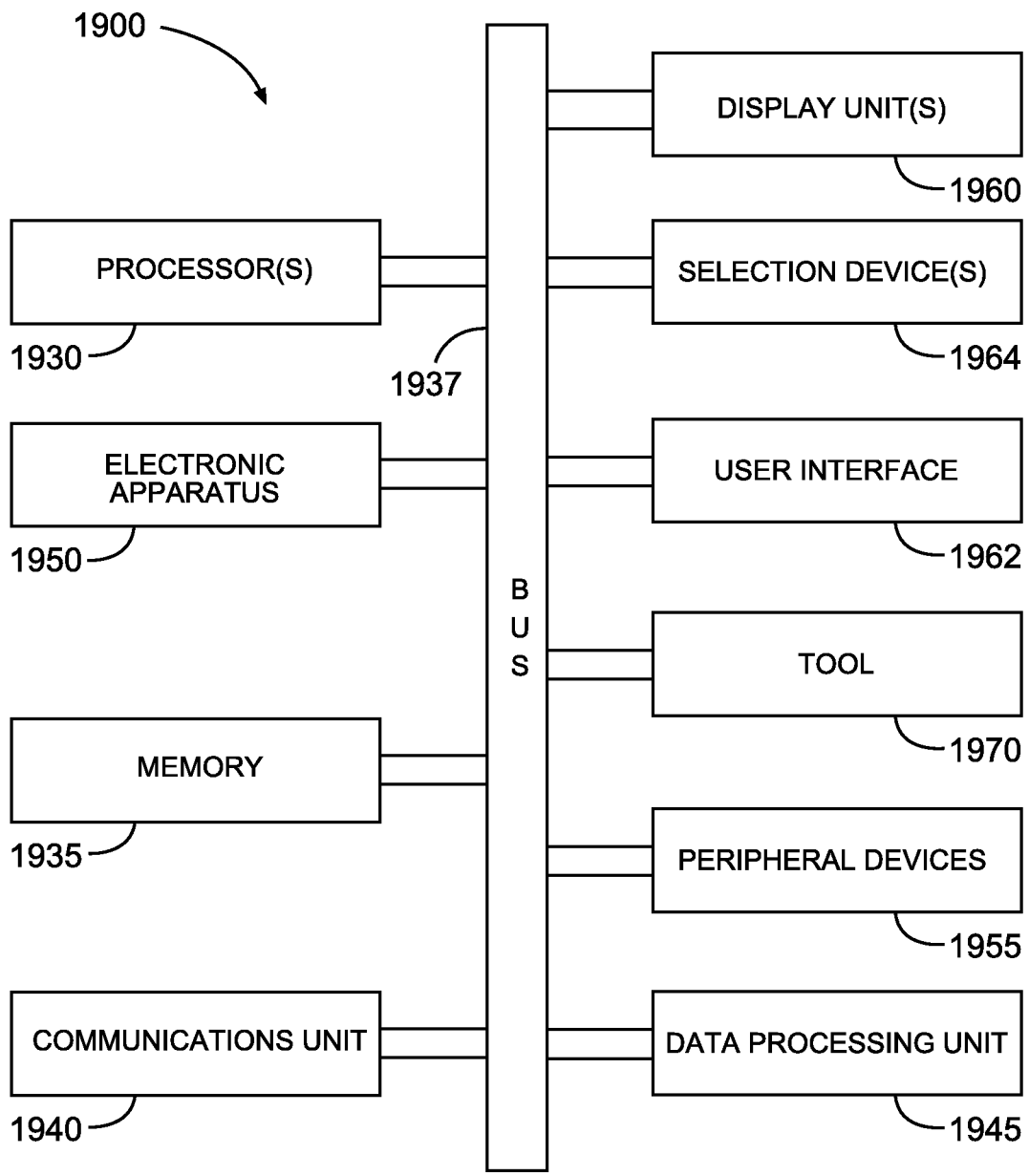
FIG. 19 depicts a block diagram of features of an example system operable to execute schemes associated with visualization of data, applications of the visualization, and combinations thereof, in accordance with various embodiments.

FIG. 19 depicts a block diagram of features of an embodiment of an example system 1900 operable to execute schemes associated with visualization of data, applications of the visualization, and combinations thereof. System 1900 can include one or more processors 1930, a user interface 1962 operable with one or more processors 1930, a data processing unit 1945 operable with user interface 1962, where one or more processors 1930, user interface 1962, and data processing unit 1945 are structured to be operated according to any scheme similar to or identical to the schemes associated with visualization of data, application of the visualization, and combinations thereof as taught herein. In an embodiment, processor(s) 1930 can be realized as a single processor or a group of processors. Processors of the group of processors may operate independently depending on an assigned function. System 1900 can be arranged to perform various operations on the data, acquired from a tool 1970 operational downhole to make measurements with respect to formations, in a manner similar or identical to any of the processing techniques discussed herein.

System 1900 can be arranged as a distributed system and can include components in addition to one or more processors 1960, user interface 1962, and data processing unit 1945. System 1900 can include tool 1970 that makes measurements that provide data that can be operated in one format or another by one or more processors 1930, user interface 1962, and data processing unit 1945 to present information regarding a formation. Such information may be presented as a visualization with respect to parameters of the formation, plotted distances from the measuring tool to beds of the formation, or various combinations of such information.

System 1900 can include a memory 1935, an electronic apparatus 1950, and a communications unit 1940. Processor(s) 1930, memory 1935, and communications unit 1940 can be arranged to operate as a processing unit to control management of tool 1970 and to perform operations on data signals collected by tool 1970. Memory 1935 can include a database having information and other data such that system 1900 can operate on data from tool 1970 in a post-processing manner in addition to operating on such data in real-time. In an embodiment, data processing unit 1945 can be distributed among the components of system 1900 including electronic apparatus 1950.

Communications unit 1940 can include downhole communications for communication to the surface at a well from tool 1970. Such downhole communications can include a telemetry system. Communications unit 1940 may use combinations of wired communication technologies and wireless technologies at frequencies that do not interfere with on-going measurements. Communications unit 1940 can allow for a portion or all of the data analysis to be conducted downhole with results provided to user interface 1962 for presentation on one or more display unit(s) 1960 aboveground. However, communications unit 1940 can provide for data to be sent aboveground such that substantially all analysis is preformed aboveground. Communications unit 1940 can allow for transmission of commands to tool 1970 or drilling control downhole in response to signals provided by a user through user interface 1962, which allows interactive control of a drilling operation. For instance, system 1900 can be realized having geosteering capabilities. System 1900 can also provide information to make a petrophysical, stratigraphical, or geophysical determinations or to generate logs of one or more formation properties.

System 1900 can also include a bus 1937, where bus 1937 provides electrical conductivity among the components of system 1900. Bus 1937 can include an address bus, a data bus, and a control bus, each independently configured. Bus 1937 can be realized using a number of different communication mediums that allows for the distribution of components of system 1900. Use of bus 1937 can be regulated by processor(s) 1930. Bus 1937 can include a network to transmit and receive signals including data signals and command and control signals.

In various embodiments, peripheral devices 1955 can include additional storage memory and/or other control devices that may operate in conjunction with processor(s) 1930 and/or memory 1935. Display unit(s) 1960 can be arranged with a screen display, as a distributed component on the surface, that can be used with instructions stored in memory 1935 to implement user interface 1962 to manage the operation of tool 1970 and/or components distributed within system 1900. Such a user interface can be operated in conjunction with communications unit 1940 and bus 1937. Display unit(s) 1960 can include a video screen, a printing device, or other structure to visually project information. System 1900 can include a number of selection devices 1964 operable with user interface 1962 to provide user inputs to operate data processing unit 1945 or its equivalent. Selection device(s) 1964 can include one or more of a touch screen or a computer mouse operable with user interface 1962 to provide user inputs to operate the data processing unit.

System 1900 can be compatible with a logging while drilling operation. System 1900 can be also compatible with a wireline operation. System 1900 can be arranged as a distributed system for a land-based drilling operation, a sea-based drilling operation, or a drilling operation having land-based and sea-based components.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
    acquiring formation property data, at least in part, by a measurement tool collecting measurement data at multiple positions along a drilling path, wherein the formation property data corresponds to the measurement data, wherein acquiring formation property data includes acquiring results of an inversion of a formation resistivity or a distance;
    generating a representation of the formation property data by,
        mapping the formation property data to a first presentation format that varies based on values of the formation property; and
        mapping the formation property data to a second presentation format that varies based on a depth of investigation of the measurement tool; and
    displaying the representation of the formation property data including displaying the formation property data in accordance with the mapping of the formation property data to the first presentation format and the second presentation format and in association with at least two formation length dimensions.

2. The method of claim 1, further comprising:
    providing the representation of the formation property data on an interactive user interface;
    receiving inputs from the interactive user interface; and
    generating an output visualization comprising the displayed representation of the formation property data based, at least in part, on the received inputs.

3. The method of claim 2, further comprising generating a second output visualization based on the received inputs, providing the information to make the geosteering decision.

4. The method of claim 3, wherein the received inputs include information to adjust inversion of the formation property data to generate the second output visualization.

5. The method of claim 2, further comprising outputting a geosteering signal representing a geosteering decision that is based, at least in part, on the output visualization, wherein the geosteering decision includes stopping a drilling operation, changing a direction of the drilling operation, changing a speed of the drilling operation, or taking additional data to generate new values for a new visualization and new geosteering decision.

6. The method of claim 1, further comprising:
    accessing a non-transitory machine-readable storage device to collect the formation property data;
    providing the representation of the formation property data to an interactive user interface;

receiving inputs from the interactive user interface; and generating an output visualization comprising the displayed representation of the formation property data based, at least in part, on the received inputs to provide information to make a petrophysical, stratigraphical, or geophysical determination or to generate logs of one or more formation properties.

7. The method of claim 6, further comprising generating another output visualization based on the received inputs.

8. The method of claim 7, wherein the received inputs include information to adjust inversion of the data to generate the other output visualization.

9. The method of claim 1, wherein said mapping the formation property data to a first presentation format comprises mapping the formation property data to a color palette including multiple colors.

10. The method of claim 9, wherein said mapping the formation property data to a second presentation format comprises applying a transparency mapping algorithm that causes the color image of portions of the displayed formation property data to fade depending on a measurement tool depth of investigation.

11. A method comprising:

acquiring formation property data, at least in part, by a measurement tool collecting measurement data at multiple positions along a drilling path, wherein the formation property data corresponds to the measurement data;

generating a representation of the formation property data by, mapping the formation property data to a first presentation format that varies based on values of the formation property;

mapping the formation property data to a pattern density or a pattern size that varies based on a depth of investigation of the measurement tool;

correlating a parameter of interest with the one or more of the pattern density or the pattern size; and displaying the representation of the formation property data, including displaying the formation property data in accordance with the mapping of the formation property data to the first presentation format and the pattern density or pattern size and in association with at least two formation length dimensions.

12. The method of claim 11, wherein the method includes applying a sensitivity multiplier function to the one or more of the pattern density or the pattern size.

13. The method of claim 12, wherein the sensitivity multiplier function is given by $$s(d) = \begin{cases} 1 & \text{if } d < DOI \\ e^{-\frac{(d-DOI)}{DOI}} & \text{if } d \geq DOI \end{cases},$$

where d represents a distance from the tool and DOI is the depth of investigation.

14. The method of claim 11, wherein the method includes applying a sensitivity multiplier function with respect to the parameter of interest.

15. The method of claim 14, wherein the sensitivity multiplier function is given by $$s(d(x, y, z)) = \begin{cases} P(x, y, z) & \text{if } d < DOI \\ e^{-\frac{(d(x,y,z)-DOI)}{DOI}} \times P(x, y, z) & \text{if } d \geq DOI \end{cases},$$

where d(x, y, z) represents distance from the tool, DOI is the depth of investigation, and P(x, y, z) represents the parameter of interest with coordinates (x, y, z).

16. A method comprising:

acquiring formation property data, at least in part, by a measurement tool collecting measurement data at multiple positions along a drilling path, wherein the formation property data corresponds to the measurement data;

generating a representation of the formation property data by, mapping the formation property data to pattern types having a pattern density or a pattern size that vary based on values of the formation property, wherein the pattern types includes a dot and a line; and mapping the formation property data to a presentation format that varies based on a depth of investigation of the measurement tool; and displaying the representation of the formation property data including displaying the formation property data in accordance with the mapping of the formation property data to the pattern types and the presentation format and in association with at least two formation length dimensions, wherein at least one or more of the pattern density or the pattern size of a pattern decreases based on a decrease in the values of the formation property.

17. The method of claim 16, wherein the method includes mapping resistivity to a dot density.

18. The method of claim 16, wherein the method includes mapping resistivity to a line density.

19. The method of claim 16, wherein lines represent a reservoir layer, dots represent non-reservoir shoulder beds, a density of the lines indicates a value of a formation property of the reservoir layer, and a density of dots represent a value of a formation property of the non-reservoir shoulder beds.

20. The method of claim 16, wherein the values of the formation property are resistivity values.

21. A method comprising:

acquiring formation property data, at least in part, by a measurement tool collecting measurement data at multiple positions along a drilling path, wherein the formation property data corresponds to the measurement data;

generating a representation of the formation property data by using a three-dimensional image of the formation property data in which a formation property value is mapped to a height of the three-dimensional image, wherein the height is represented along the drilling path;

using contour lines to map the height along the drilling path; and displaying the representation of the formation property data including displaying the three-dimensional image of the formation property data in association with at least two formation length dimensions.

22. A method comprising:

acquiring formation property data, at least in part, by a measurement tool collecting measurement data at multiple positions along a drilling path, wherein the formation property data corresponds to the measurement data;

generating a representation of the formation property data by, mapping the formation property data to text that varies based on values of the formation property; and mapping the formation property data to a color scale that varies based on a depth of investigation of the measurement tool; and displaying the representation of the formation property data including displaying the formation property data in accordance with the mapping of the formation property data to text and the color scale, wherein at least one color of the text changes based on the depth of investigation, and wherein the displayed positions of the text are based on locations of the formation property value measurements corresponding to the text.

23. The method of claim 22, wherein representation of the formation property data only consists of text.

24. The method of claim 22, wherein the text is mapped to a grid.

25. The method of claim 24, wherein the grid is uniform in an x-axis direction as an abscissa of the displayed representation.

26. The method of claim 22, wherein variation of font size of the text represents variation of the measurement data or the formation property data.

27. The method of claim 22, wherein the method includes adjusting orientation of individual text to indicate bed dip.

28. The method of claim 22, wherein the text indicates a formation resistivity value.

29. The method of claim 22, wherein the text indicates a plotted distance value to a formation boundary.

30. A method comprising:
acquiring formation property data, at least in part, by collecting measurement data at multiple positions along a drilling path, wherein the formation property data corresponds to the measurement data;
generating a representation of the formation property data by,
mapping a formation property type to a shape; and
mapping a formation property value to a size of the shape; and
displaying the representation of the formation property data, wherein the size of the shape increases based on an increase in the formation property value.

31. The method of claim 30, wherein the formation property is resistivity and the size of the shape varies in proportion to variation of the resistivity.

32. A method comprising:
acquiring formation property data, at least in part, by collecting measurement data at multiple positions along a drilling path, wherein the formation property data corresponds to the measurement data;
generating a representation of the formation property data by, mapping formation property data to a plotted distance from a formation boundary that varies based on values of the formation property; and
displaying the representation of the formation property data.

33. The method of claim 32, wherein generating the representation of the formation property data includes assigning a color to formation boundaries and mapping lines with another color such that the mapping lines are placed at plotted distances from formation boundaries indicating values of the formation property.

34. The method of claim 33, wherein generating the representation of the formation property data includes adding arrows or text that indicates a direction that is the shortest distance to a bed at a point corresponding to a path of the tool.

35. A method comprising:
acquiring formation property data, at least in part, by collecting measurement data at multiple positions along a drilling path using a tool, wherein the formation property data corresponds to the measurement data;
generating a representation of the formation property data by,
mapping the formation property data into a three-dimensional representation using a line having a fixed color to describe the drilling path, shapes representing the measurement data at respective depths with each shape having a color mapped to a color bar corresponding to its respective formation property value, the color bar ranging over the formation property values, and other shapes indicating shoulder-beds within a maximum detection range of the tool with each of the other shapes having a color mapped to the color bar corresponding to its respective formation property value; and
displaying the representation of the formation property data, wherein the line having the fixed color intersects through the shapes indicating formation property along the drilling path.

36. The method of claim 35, wherein the three-dimensional representation is rotated providing a number of two-dimensional mappings concurrently.

37. A non-transitory machine-readable storage device having instructions stored thereon, which, when executed by one or more processors of a machine, cause the machine to perform operations, the operations comprising:
acquiring formation property data based, at least in part, on measurement data collected by a measurement tool at multiple positions along a drilling path, wherein the formation property data corresponds to the measurement data;
generating a representation of the formation property data by,
mapping the formation property data to a first presentation format that varies based on values of the formation property; and
mapping the formation property data to a second presentation format that varies based on a measurement tool depth of investigation;
displaying the representation of the formation property data including displaying the formation property data in accordance with the mapping of the formation property data to the first presentation format and the second presentation format and in association with at least two formation length dimensions;
re-determining the measurement tool depth of investigation based on a position of the measurement tool;
re-generating the representation of the formation property data based on the constantly re-determined measurement tool depth of investigation; and
updating the displayed representation of the formation property data to include the automatically re-generated representation.

38. A system comprising:
a measurement tool that collects measurement data at multiple positions along a drilling path;
one or more processors;
a screen operable with the user interface; and
a non-transitory machine-readable storage device having instructions executable by the one or more processors to cause the system to:
acquire formation property that corresponds to the collected measurement data;

generate a representation of the formation property data by,
- mapping the formation property data to a first presentation format that varies based on values of the formation property; and
- mapping the formation property data to a second presentation format that varies based on a measurement tool depth of investigation;

display the representation of the formation property data including displaying the formation property data in accordance with the mapping of the formation property data to the first presentation format and the second presentation format and in association with at least two formation length dimensions;

constantly re-determine the measurement tool depth of investigation based on a position of the measurement tool;

re-generate the representation of the formation property data based on the constantly re-determined measurement tool depth of investigation; and update the displayed representation of the formation property data to include the re-generated representation.

39. The system of claim 38, further comprising:

a user interface operable with the one or more processors; and a screen operable with the user interface to display user inputs to operate the system.

40. The system of claim 39, wherein the system includes a computer mouse operable with the user interface to provide user inputs to operate the system.

41. The system of claim 38, wherein the system is compatible with a logging while drilling operation.

* * * * *